(12) United States Patent
Jindal et al.

(10) Patent No.: US 12,254,264 B2
(45) Date of Patent: Mar. 18, 2025

(54) OBJECT LEVEL SELECTIVE UNDO IN DIGITAL GRAPHIC DESIGN DOCUMENTS

(71) Applicant: Adobe Inc., San Jose, CA (US)

(72) Inventors: Ashish Jindal, Delhi (IN); Praveen Kumar Dhanuka, Howrah (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/328,330

(22) Filed: Jun. 2, 2023

(65) Prior Publication Data

US 2024/0403542 A1    Dec. 5, 2024

(51) Int. Cl.
*G06F 40/197*    (2020.01)
*G06F 3/0484*    (2022.01)
*G06F 40/166*    (2020.01)

(52) U.S. Cl.
CPC .......... *G06F 40/166* (2020.01); *G06F 3/0484* (2013.01); *G06F 40/197* (2020.01)

(58) Field of Classification Search
None
See application file for complete search history.

(56) References Cited

U.S. PATENT DOCUMENTS

| | | | |
|---|---|---|---|
| 5,764,877 A * | 6/1998 | Lomet ................. | G06F 11/1451 714/6.32 |
| 11,392,868 B1 * | 7/2022 | Malamut ............ | H04L 41/5029 |
| 2004/0068678 A1 * | 4/2004 | Li ....................... | G06F 11/3612 714/E11.212 |
| 2022/0222625 A1 * | 7/2022 | Haramati ............ | G06T 13/00 |
| 2024/0078156 A1 * | 3/2024 | Oruganti .............. | G06F 3/0482 |

FOREIGN PATENT DOCUMENTS

WO    WO-2011123924 A1 *  10/2011 ............. G06Q 40/04

OTHER PUBLICATIONS

Zhang, et al., "Implementing Undo/redo in PDF Studio Using Object-Oriented Design Pattern" Proceedings 36th International Conference on Technology of Object-Oriented Languages and Systems. TOOLS—Asia 2000, copyright 2000 IEE, pp. 58-64. (Year: 2000).*
Cheng et al., "A multi-user selective undo/redo approach for collaborative CAD systems," Journal of Computational Design and Engineering, vol. 1, Issue 2, Apr. 2014, pp. 103-115. (Year: 2014).*
Berlage, "A selective undo mechanism for graphical user interfaces based on command objects," ACM Transactions on Computer-Human Interaction (TOCHI), vol. 1, Issue 3, Sep. 1994, pp. 269-294. (Year: 1994).*

* cited by examiner

*Primary Examiner* — Amelia L Tapp
(74) *Attorney, Agent, or Firm* — Keller Preece PLLC

(57) ABSTRACT

The present disclosure relates to systems, methods, and non-transitory computer readable media for performing object-specific undo and/or redo operations. For example, in one or more embodiments, the disclosed systems receive a modified digital design image comprising a first modified object and a second modified object. In some examples, the second modified object is modified after the first modified object. The disclosed systems can generate and utilize an object-specific version representation to undo an edit to the first modified object without undoing edits to the second modified object. The disclosed systems can generate and provide, for display via a user interface, an updated digital design document comprising a reverted first object and the second modified object.

20 Claims, 14 Drawing Sheets

OBJECT LEVEL SELECTIVE UNDO IN DIGITAL GRAPHIC DESIGN DOCUMENTS

BACKGROUND

Recent years have seen significant improvement in hardware and software platforms for generating and editing computer graphics. For example, developers have created technologies to modify or improve computer graphics platforms to create graphic design images. To illustrate, conventional graphic design systems often provide digital tools to assist designers in creating and modifying graphic designs. More particularly, conventional systems present graphic design tools to designers for undoing and/or redoing edits. Despite these advances, however, many conventional systems continue to demonstrate a number of deficiencies or drawbacks, particularly in accuracy and efficiency of implementing computing devices.

SUMMARY

This disclosure describes one or more embodiments of systems, methods, and non-transitory computer readable media that solve one or more of the foregoing or other problems in the art with systems and methods for providing object-level-selective undo operations in graphic design workflows. For example, the disclosed system tracks changes done to and different versions of objects within a graphic design. After tracking the changes, the disclosed system can persist the version information and efficiently store the information in a data structure. The disclosed method may linearly traverse among version information concerning an object when performing an undo or redo operation for the object. Based on designer indication of an object-specific undo operation on a given object, the disclosed system can modify the given object without undoing all subsequent changes made to all objects within the graphic design.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
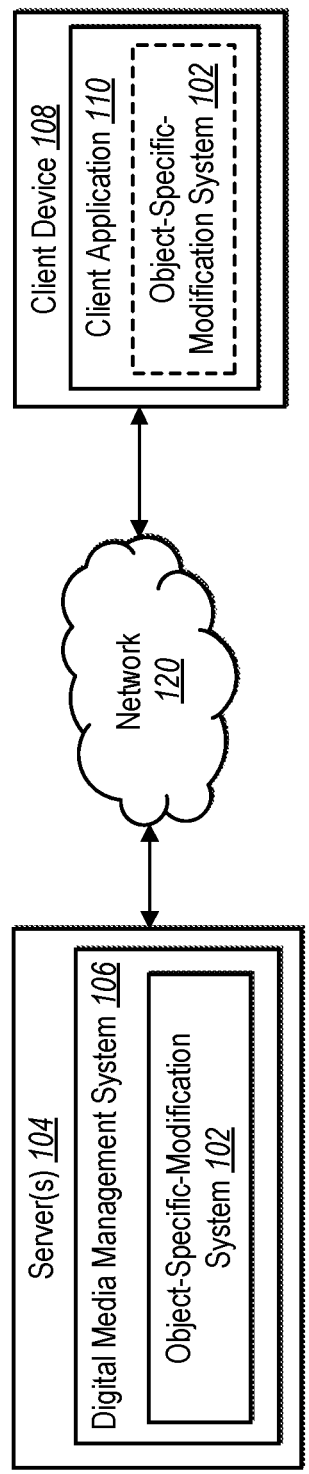
FIG. 1 illustrates a schematic diagram of an example system environment for implementing an object-specific-modification system in accordance with one or more embodiments.

This disclosure describes one or more embodiments of an object-specific-modification system that efficiently and accurately perform object-specific undo operations for a digital design document. In particular, the object-specific-modification system allows for undoing of changes at an object level which assists in better creative exploration of design combinations. Moreover, the object-specific-modification system efficiently stores versioning information for each object which can be used to interpolate between deltas. In one or more implementations, this versioning information can be surfaced as a time-lapse view of document creation. In some embodiments, the object-specific-modification system utilizes a relational database that can be used across applications. Moreover, in one or more embodiments, the delta-based storage mechanism optimizes usage of disk space and B+ tree based retrieval efficiently fetches the desired version, making the system robust and scalable. Further, the object-specific-modification system applies to both individual and composite nodes within the object-based model.

For example, in one or more implementations the object-specific-modification system receives a modified digital design document comprising a first modified object and a second modified object. In some examples, the second modified object is modified after the first modified object. The object-specific-modification system further receives a user interaction indicating an object-specific undo operation on the first modified object. In response, the object-specific-modification system generates a reverted first object by undoing an edit to the first modified object. The object-specific-modification system can provide an updated digital design document comprising the reverted first object and the second modified object.

In some implementations, the object-specific-modification system can undo an edit to a first modified object while leaving a second modified object in its modified state. In one example, the second modified object is modified or changed after the first modified object. The object-specific-modification system can generate a reverted first object by undoing the edit to the first modified object without undoing an edit to the second modified object.

In some examples, the object-specific-modification system can perform object-specific undo operations based on generating object-specific version representations. For example, the object-specific-modification system can generate an object-specific tree structure having a plurality of nodes and map different objects and different versions of objects to the object-specific tree structure. By utilizing an efficient storage method, the object-specific-modification system can both track versions of objects and persist version information for accurate retrieval.

As discussed above, conventional systems face a variety of technical deficiencies in performing undo operations. Conventional systems are often inflexible. To illustrate, graphics design is often a non-linear and iterative process where designers change all design objects in no specific order until designers arrive at a final digital design image. Many conventional systems force an artificial linear timeline on a set of changes at a document level scope. When performing undo or redo operations, conventional systems are often rigidly limited to performing the operations in the order in which they occurred-regardless of the object modified. Accordingly, conventional systems are often unable to flexibly undo and/or redo edits to specific objects within a digital design image.

Due, in part, to technical deficiencies with flexibility, conventional systems are often inefficient. For example, if a designer wants to undo a change made to a particular object within a digital design image, conventional systems often require multiple user interactions and computational processes to undo all subsequent changes made to all other objects after that point in time at which the change was made. Thus, conventional systems often utilize excessive time, interactions, and computing/storage resources to make modifications and undo those modifications. Furthermore, many conventional systems require excessive user interactions to re-do modifications to arrive at a final digital design image. In addition, conventional systems utilize inefficient storage mechanisms to identify and recall previous operations.

Moreover, conventional systems are often inaccurate. To illustrate, some conventional systems generate digital design images that fail to reflect initial modifications. For example, by undoing all modifications up to a particular modification for a particular object, conventional systems often lose information relating to the undone modifications. Accordingly, designers often fail to accurately re-implement the undone modifications. Furthermore, the inefficiencies and inflexibilities described above further undermine the ability of conventional systems to generate digital design documents reflecting desired object properties.

As suggested above, embodiments of the object-specific-modification system provide certain improvements or advantages over conventional systems. Indeed, the object-specific-modification system utilizes a relational database-based storage system that includes tracking the changes to objects in a digital design document. More specifically, the object-specific-modification system can utilize the relational database-based storage system to efficiently persist any number of versions of objects and access the versions of objects. For example, the object-specific-modification system generates an object-specific version representation comprising version data for versions of each object. The object-specific-modification system persists version data in the object-specific version representation. By managing and accessing version data, the object-specific-modification system can efficiently and accurately perform linear undo or redo operations for each object.

Additionally, the object-specific-modification system can perform an object-specific undo operation on a first modified object that was modified before a second modified object. In some examples, the object-specific-modification system provides an option for an object-specific undo operation. Based on user interaction indicating the object-specific undo operation, the object-specific-modification system can generate a reverted first object by undoing an edit to the first object without affecting the second modified object.

By generating and utilizing an object-specific version representation for objects within a digital design document, the object-specific-modification system improves flexibility. In contrast to conventional systems that rigidly rely on a linear timeline for all changes performed within a digital design document, the object-specific-modification system flexibly perform undo or redo operations for individual objects. More specifically, the object-specific-modification system can generate and maintain an object-specific version representation that stores version information for each design object within a digital design document. The object-specific-modification system can traverse the object-specific version representation to locate version data for each individual object to perform undo or redo operations for the object without affecting other objects.

Furthermore, the object-specific-modification system can also improve efficiency. More specifically, if a designer wants to undo a change to a particular object, the object-specific-modification system provides the option for the object-specific undo operation. Instead of requiring designers to make multiple selections and operations to undo a particular modification, the object-specific-modification system provides an object-specific undo element within a graphical user interface. Furthermore, the object-specific-modification system can obviate the requirement of additional storage and computing resources required by conventional systems to estimate or redo modifications to other objects.

In one or more embodiments, the object-specific-modification system significantly improves storage efficiency. More specifically, by utilizing a relational database-based storage system, the object-specific-modification system efficiently stores data for versions of objects within a digital design. For instance, the object-specific-modification system can store information of each version of an object utilizing a packing mechanism. Indeed, the object-specific-modification system can compress version information against each other to take advantage of common data. In one or more implementations, the object-specific-modification system compares different versions and stores offset values between the different versions (i.e., rather than a complete record of the versioning data). Indeed, the object-specific-modification system can iteratively generate and store multiple offset values to form a delta chain (in reverse chronological order) that allows for efficient storage and extraction of digital design element information corresponding to different versions.

The object-specific-modification system also improves accuracy. More specifically, the object-specific-modification system can maintain modifications for all other objects beside the target undo object. Thus, instead of relying on designers to manually undo a modification to a target object or redo modifications to other objects, the object-specific-modification system stores historical version information for objects within a digital design document. Thus, the object-specific-modification system can improve accuracy relative to conventional systems.

Additional detail regarding the object-specific-modification system will now be provided with reference to the figures. For example, FIG. 1 illustrates a schematic diagram of an example system environment for implementing an object-specific-modification system 102 in accordance with one or more embodiments. An overview of the object-specific-modification system 102 is described in relation to FIG. 1. Thereafter, a more detailed description of the components and processes of the object-specific-modification system 102 is provided in relation to the subsequent figures.

As shown, the environment includes server(s) 104, client device 108, a digital media management system 106, and a network 120. Each of the components of the environment communicate via the network 120, and the network 120 is any suitable network over which computing devices communicate. Example networks are discussed in more detail below in relation to FIG. 10.

As mentioned, the environment includes the client device 108. The client device 108 is one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single instance of the client device 108, in some embodiments, the environment includes multiple different client devices, each associated with a different user. The client device 108 communicates with the server(s) 104 and/or the digital media management system 106 via the network 120. For example, the client device 108 transmits one or more digital design documents to the digital media management system 106 and provides information to server(s) 104 indicating client device interactions (e.g., modifications to objects within the digital design documents).

As shown in FIG. 1, the client device 108 includes a client application 110. In particular, the client application 110 is a web application, a native application installed on the client device 108 (e.g., a mobile application or a desktop application), or a cloud-based application where all or part of the functionality is performed by the server(s) 104. The client application 110 presents or displays information to a user, including digital images and/or modified digital images generated utilizing the object-specific-modification system 102.

As further illustrated in FIG. 1, the environment includes a digital media management system 106. In particular, the digital media management system 106 receives, generates, modifies, provides, stores, manages, and/or distributes digital media. For example, the digital media management system 106 stores digital media such as digital images, digital documents, or digital videos, provides the digital media for display, edits the digital media, and manages access to the digital media to authorized devices. In some cases, the digital media management system 106 utilizes a database to store or maintain digital media.

As illustrated in FIG. 1, the environment includes the server(s) 104. In some embodiments, the server(s) 104 communicates with the client device 108 to transmit and/or receive data via the network 120. In some embodiments, the server(s) 104 comprises a distributed server where the server(s) 104 includes a number of server devices distributed across the network 120 and located in different physical locations. The server(s) 104 comprise a content server, an application server, a communication server, a web-hosting server, a multidimensional server, or a machine learning server.

As further shown in FIG. 1, the server(s) 104 also includes the object-specific-modification system 102 as part of the digital media management system 106. For example, as discussed in greater detail below, the object-specific-modification system 102 modifies particular objects within a digital design document utilizing undo or redo operations. Moreover, the object-specific-modification system 102 can generate and utilize an object-specific version representation to store version data corresponding to objects within a digital design document.

In one or more embodiments, the server(s) 104 includes all, or a portion of, the object-specific-modification system 102. For example, the object-specific-modification system 102 operates on the server(s) 104 to generate modified digital images. In certain cases, the client device 108 includes all or part of the object-specific-modification system 102. For example, the client device 108 generates, obtains (e.g., download), or utilizes one or more aspects of the object-specific-modification system 102, such as an object-specific version representation or other version data. Indeed, in some implementations, as illustrated in FIG. 1, the object-specific-modification system 102 is located in whole or in part of the client device 108. For example, the object-specific-modification system 102 includes a web hosting application that allows the client device 108 to interact with the server(s) 104. To illustrate, in one or more implementations, the client device 108 accesses a web page supported and/or hosted by the server(s) 104.

Although FIG. 1 illustrates a particular arrangement of the environment, in some embodiments, the environment has a different arrangement of components and/or may have a different number or set of components altogether. For instance, in some embodiments, the object-specific-modification system 102 is implemented by (e.g., located entirely or in part on) the client device 108. In addition, in one or more embodiments, the client device 108 communicates directly with the object-specific-modification system 102 at the server(s) 104, bypassing the network 120.

Figure 2:
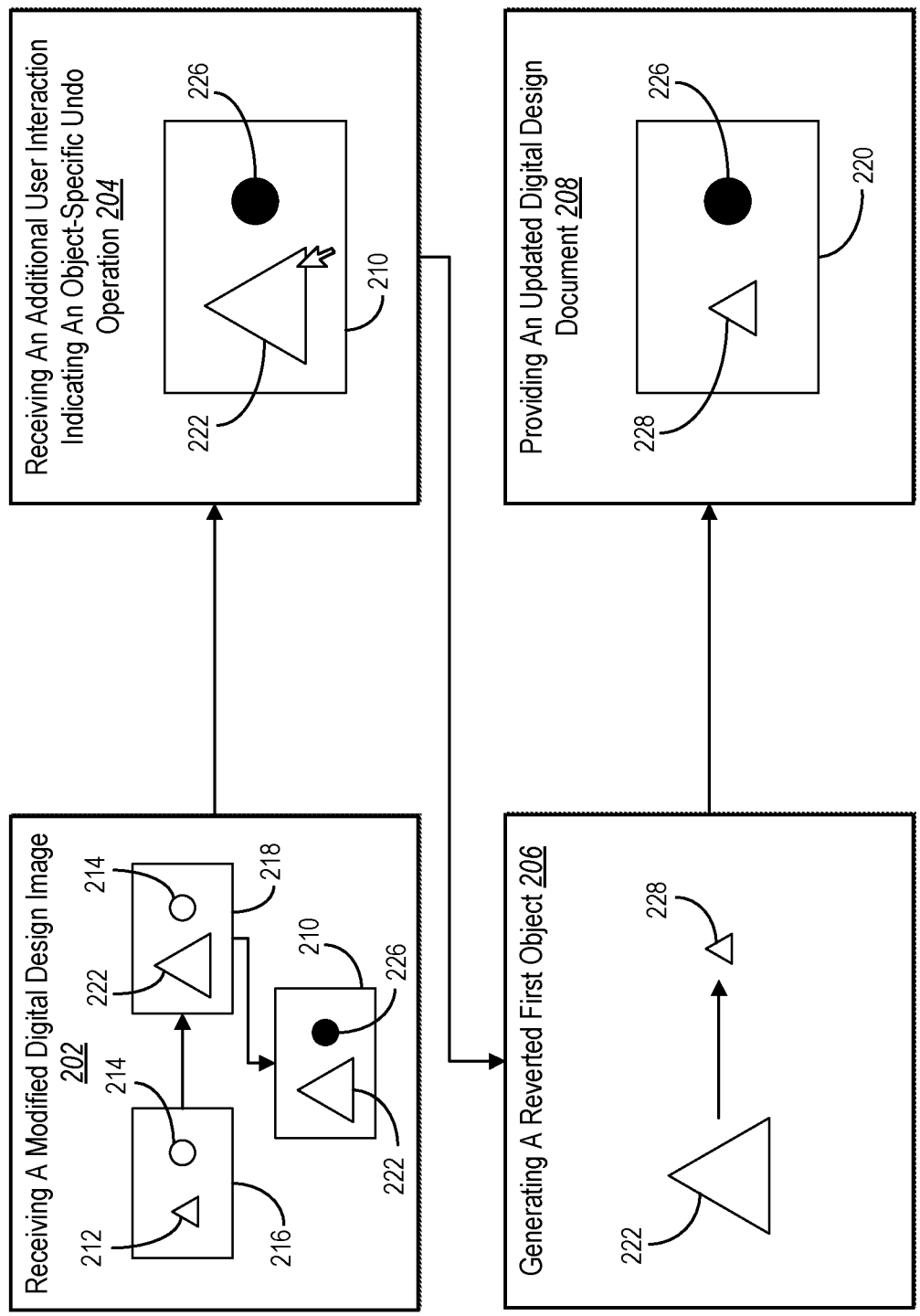
FIG. 2 illustrates generating an updated digital design image in accordance with one or more embodiments of the present disclosure.

As mentioned, in one or more embodiments, the object-specific-modification system 102 generates an updated digital design document comprising a reverted first object and a modified second object. FIG. 2 illustrates the object-specific-modification system 102 generating an updated digital design image in accordance with one or more embodiments of the present disclosure. By way of overview, FIG. 2 illustrates a series of acts including an act 202 of receiving a modified digital design image, an act 204 of receiving an additional user interaction indicating an object-specific undo operation, an act 206 of generating a reverted first object, and an act 208 of providing an updated digital design document.

As shown in FIG. 2, the object-specific-modification system 102 performs the act 202 of receiving a modified digital design image. As used herein, the term digital design image refers to a digital image comprising design components. In some cases, a digital design image comprises a vector drawing that contains objects. For instance, a digital design image can comprise art objects, text, photographic images, and other types of objects. Relatedly, a modified digital design image refers to a digital design image having modified objects.

FIG. 2 illustrates an example of a modified digital design image 210. As shown, digital design image 216 comprises a first object 212 and a second object 214. Generally, the term object refers to a graphic element within a digital design image. For instance, an object can comprise points, lines, curves, shapes, text, and other graphic elements. As illustrated in FIG. 2, the first object 212 comprises a triangle, and the second object 214 comprises a circle.

In some implementations, the object-specific-modification system 102 modifies objects within digital design images. As shown in FIG. 2, the object-specific-modification system 102 generates a modified digital design image 218 by expanding or enlarging the first object 212 to generate a first modified object 222. In other words, the object-specific-modification system 102 changes the first object from a first version comprising a small triangle to a second version comprising a larger triangle. As illustrated, the second object 214 is unchanged in the modified digital design image 218.

In a subsequent modification, and as shown in the modified digital design image 210, the object-specific-modification system 102 fills the second object 214 to form a second modified object 226. More specifically, the object-specific-modification system 102 changes the second object 214 from a third version to a fourth version. Thus, the modified digital design image 210 includes the first modified object 222 (i.e., the first object in the second version) and the second modified object 226 (i.e., the second object in the fourth version). In some implementations, the object-specific-modification system 102 generates the modified digital design image 210, and in other implementations, the object-specific-modification system 102 receives the modified digital design image 210.

As described previously, conventional systems often force an artificial linear timeline on the set of changes at a digital-design-image scope. In the example digital design images illustrated in FIG. 2, conventional systems typically cannot undo an edit (e.g., enlargement) to the to the first modified object 222 without first undoing an edit (e.g., filling) to the second modified object 226. In contrast, the object-specific-modification system 102 can perform an object-specific-undo operation on the first modified object 222.

As shown in FIG. 2, the object-specific-modification system 102 performs the act 204 of receiving an additional user interaction indicating an object-specific undo operation. In some implementations, the object-specific-modification system 102 receives an indication of user selection of an object-specific undo element corresponding to the first modified object 222.

As shown in FIG. 2, based on receiving the additional user interaction, the object-specific-modification system 102 performs the act 206 of generating a reverted first object. More specifically, the object-specific-modification system 102 generates the reverted first object by undoing an edit to the first modified object 222. In the example illustrated in FIG. 2, the first modified object comprises a large triangle. The object-specific-modification system 102 undoes the enlargement modification and generates a reverted first object 228 comprising a small triangle. The reverted first object 228 is identical to the first object 212 in the digital design image 216. More specifically, the object-specific-modification system 102 reverts the first object from the second version to the first version. In some examples, and as illustrated in FIG. 2, the object-specific-modification system 102 undoes edits to the first modified object 222 without undoing edits to second modified object 226.

Figure 3:
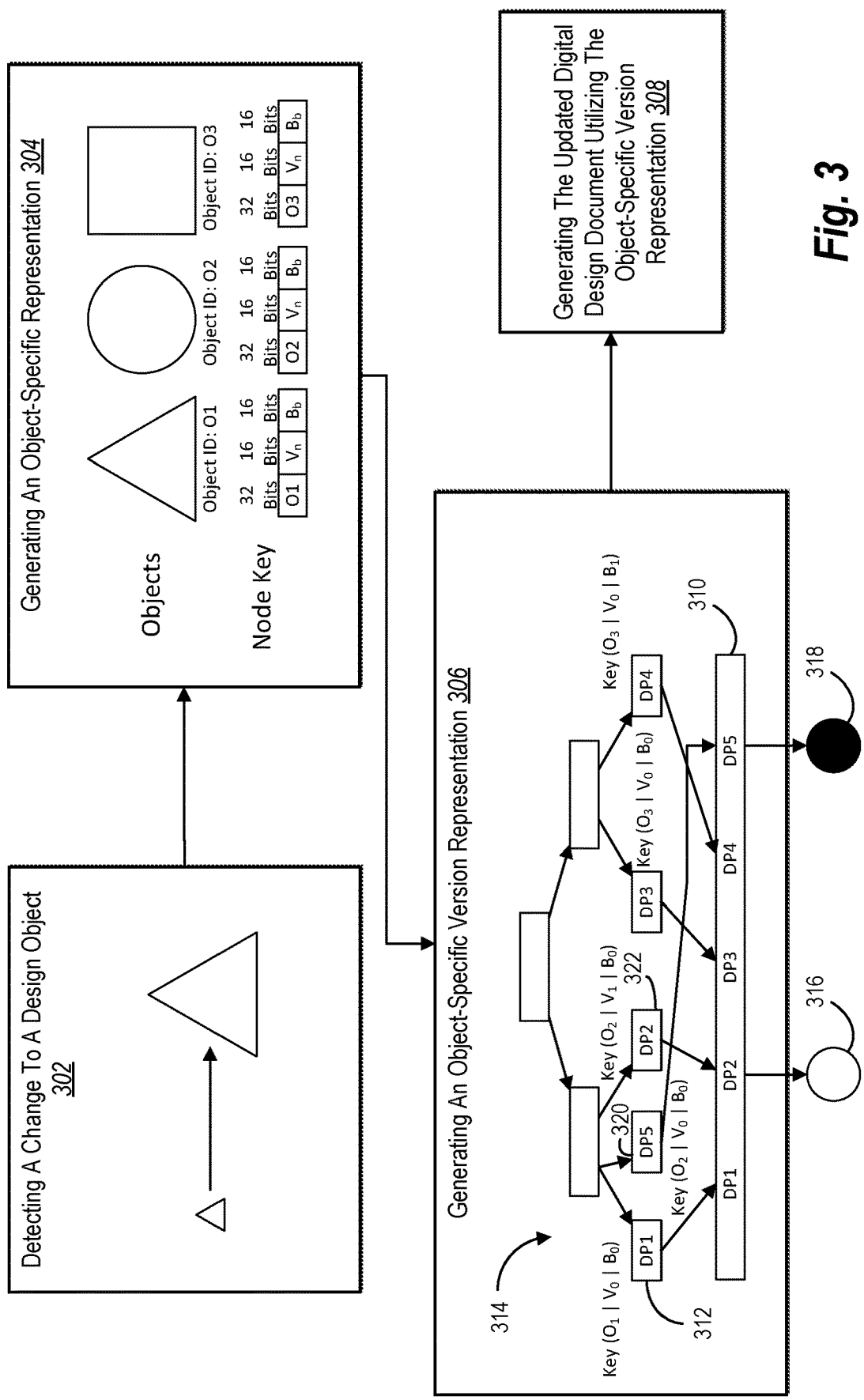
FIG. 3 illustrates generating an updated digital design document utilizing an object-specific version representation in accordance with one or more implementations of the current disclosure.

In some implementations, the object-specific-modification system 102 performs the act 208 of providing an updated digital design document. As illustrated, the object-specific-modification system 102 generates an updated digital design document 220 comprising the reverted first object 228 (i.e., the first object in the first version) and the second modified object 226 (i.e., the second object in the fourth version). In some implementations, the object-specific-modification system 102 generates the updated digital design document 220 by generating and utilizing an object-specific version representation comprising version representations corresponding to versions of the first object and the second object. FIG. 3 and the corresponding discussion further detail how the object-specific-modification system 102 utilizes an object-specific version representation to generate the updated digital design document 220 in accordance with one or more embodiments.

Additionally, in some implementations, the object-specific-modification system 102 performs an object-specific redo operation. More specifically, the object-specific-modification system 102 can generate a third modified digital design document by re-applying the edit to the first design object. For example, the object-specific-modification system 102 reverts the reverted first object 228 to the first modified object 222 by re-applying the edit to the first object. More specifically, the object-specific-modification system 102 changes the first object from the first version to the second version. Accordingly, the third modified digital design document comprises the first modified object 222 (i.e., the first object in the second version) and the second modified object 226 (i.e., the second design object in the fourth version). Similar to non-linear undo operations, the object-specific-modification system 102 can perform non-linear redo edits. Thus, for example, the object-specific-modification system 102 can perform additional modifications to other objects and then redo an edit to an object at a later time in the editing workflow.

As discussed, the object-specific-modification system 102 utilizes an object-specific version representation as part of generating an updated digital design document. FIG. 3 illustrates the object-specific-modification system 102 generating an updated digital design document utilizing an object-specific version representation in accordance with one or more implementations of the current disclosure. By way of overview, FIG. 3 illustrates an act 302 of detecting a change to a design object, an act 304 of generating an object-specific representation, an act 306 of generating an object specific version representation, and an act 308 of generating the updated digital design document utilizing the object-specific version representation.

As shown in FIG. 3, the object-specific-modification system 102 performs the act 302 of detecting a change to a design object. In some implementations, the object-specific-modification system 102 identifies objects that have been modified, added, deleted, or otherwise changed. In some examples, the object-specific-modification system 102 compiles a changelist containing all design object identifiers for objects undergoing any sort of change. After a pre-defined interval (t), the object-specific-modification system 102 processes the changelist to stream newer information of the objects present in the changelist. In one example, the object-specific-modification system 102 modifies and deletes an object within the same interval (t). In some embodiments, the object-specific-modification system 102 may determine to store information regarding the deleted object. In other embodiments, the object-specific-modification system 102 determines to delete information regarding the deleted object because the object will be deleted eventually. In some implementations, the object-specific-modification system 102 automatically determines the pre-defined interval (1). In some implementations, the object-specific-modification system 102 determines the pre-defined interval (t) based on user selection.

As shown in FIG. 3, the object-specific-modification system 102 performs the act 304 of generating an object-specific representation. Generally, once the object-specific-modification system 102 detects a change to an object, the object-specific-modification system 102 collects information corresponding to the object. For example, the object-specific-modification system 102 stores information regarding an object under a design object identifier (ID). In some examples, the object-specific-modification system 102 collects information and stores it as raw data in a data file. To efficiently access the data in the data file, the object-specific-modification system 102 stores information to retrieve the data inside a nodes keyed by design object identifiers.

Generally, the object-specific-modification system 102 stores information to retrieve object data inside nodes keyed using node keys. In some implementations, a node key refers to a value used to reflect information stored within a node. For example, a node key can comprise a design object identifier and location information for corresponding data in the data file. In some implementations, a node key comprises a design object identifier and a block number. Additionally, or alternatively, the object-specific-modification system 102 may generate a node key comprising a design object identifier, a block number, and a version representation. The following paragraphs further detail each of these components of node keys in accordance with one or more embodiments.

As mentioned, and as illustrated in FIG. 3, the object-specific-modification system 102 generates a node reflecting design object identifiers. For example, the object-specific-modification system 102 can generate a node key indicating a design object identifier. In some implementations, a design object identifier refers to a value that identifies a particular object. For example, a design object identifier may comprise a value derived from an object ID. As illustrated in FIG. 3, the object-specific-modification system 102 identifies object IDs O1, O2, and O3 corresponding with different objects. The object-specific-modification system 102 may accordingly generate design object identifiers derived from the object IDs. For example, the object-specific-modification system 102 can generate design object identifiers O1, O2, and O3 corresponding to the illustrated objects.

As further shown in FIG. 3, the object-specific-modification system 102 generates a node reflecting block number. For example, the node key can indicate block number. Generally, the object-specific-modification system 102 stores raw data in blocks within the data file. Block number can refer to a number of block in which data is stored. For example, a block can be 1024 bytes or 2084 bytes. Data for one version can be stored in several blocks within the data file. For example, if version data for an object comprises 2048 bytes and the block size is 1024, the object-specific-modification system 102 can store data for the single version in two blocks. As illustrated in FIG. 3, the block number $B_b$ represents block number b of the object data such that $0 <= b < B$, where B is the total number of blocks of the object data.

As mentioned previously, in some implementations, the object-specific-modification system 102 generates nodes reflecting a design object identifier and a block number. For example, in some implementations, the object-specific-modification system 102 generates nodes keyed by a design object identifier and a block number. More specifically, a node key can comprise a 64-bit integer where the first 32 bits correspond to the design object identifier and the last 32 bits correspond to the block number.

Additionally, in some embodiments, the object-specific-modification system 102 generates nodes that reflect a version number corresponding to an object. In some implementations, the term version refers to a particular form of an object. For example, a version of an object comprises the form of the object between modifications. More specifically, $V_n$ represents a version n of a particular object such that $0 <= n < N$, where N represents the total number of versions of an object. A version of an object can be reflected using numerical values. For instance, the term $V_0$ can refer to a most-recent version of an object, $V_1$ can refer to the next-most-recent version of an object, etc.

As mentioned, the object-specific-modification system 102 can generate nodes reflecting a design object identifier, a block number, and a version representation. For example, and as illustrated in FIG. 3, the object-specific-modification system 102 can generate a 64-bit node key for a node in which the first 32 bits comprise the design object identifier (e.g., O1), the next 16-bits comprise a version representation ($V_n$), and the last 16 bits comprise the block number ($B_b$).

As further illustrated in FIG. 3, the object-specific-modification system 102 performs the act 306 of generating an object-specific version representation. Generally, the term object-specific version representation refers to a data storage structure comprising representations of objects within a digital design document. For example, an object-specific version representation can comprise a tree structure comprising a plurality of nodes reflecting objects within a digital design document. In some embodiments, the object-specific version representation comprises a B+ tree or B-tree data structure. More specifically, the object-specific-modification system 102 arranges node keys in a B-tree or B+ tree as illustrated in FIG. 3. The object-specific-modification system 102 may generate a B-tree similar to those described in Graefe, Goetz. "B-tree indexes for high update rates." *ACM Sigmod Record* 35.1 (2006): 39-44, which is incorporated in its entirety herein by reference.

As shown in FIG. 3, the object-specific-modification system 102 arranges node keys in an object-specific tree structure 314. The object-specific tree structure 314 comprises a plurality of nodes. As shown, the nodes reflect a design object identifier, a version, and a block number. For instance, node 312 of the object-specific tree structure 314 reflects a design object identifier $O_1$ indicating a first object, a most recent version of the object ($V_0$), and block number 0 ($B_0$). The node 312 further includes a data pointer (DP1). The data pointer points to the corresponding version information in data file 310.

FIG. 3 illustrates the data file 310. Generally, the term data file refers to a recorded set of instructions or data. For example, the object-specific-modification system 102 can store change information or form information for objects within a disk file. The data file can be catalogued using data pointers (DP). In an illustrative example, the object-specific-modification system 102 detects a change to a design object. More specifically, the object-specific-modification system 102 detects a modification of an object corresponding to the design object identifier $O_2$ from a first version 316 to a second version 318. The object-specific-modification system 102 stores change or modification information in the data file 310. The object-specific-modification system 102 also generates a data pointer (DP5) which points to the new version information in the data file 310. The object-specific-modification system 102 creates a node 320 in the object-specific tree structure 314 that is keyed to the latest data pointer (i.e., DP5).

Figure 4:
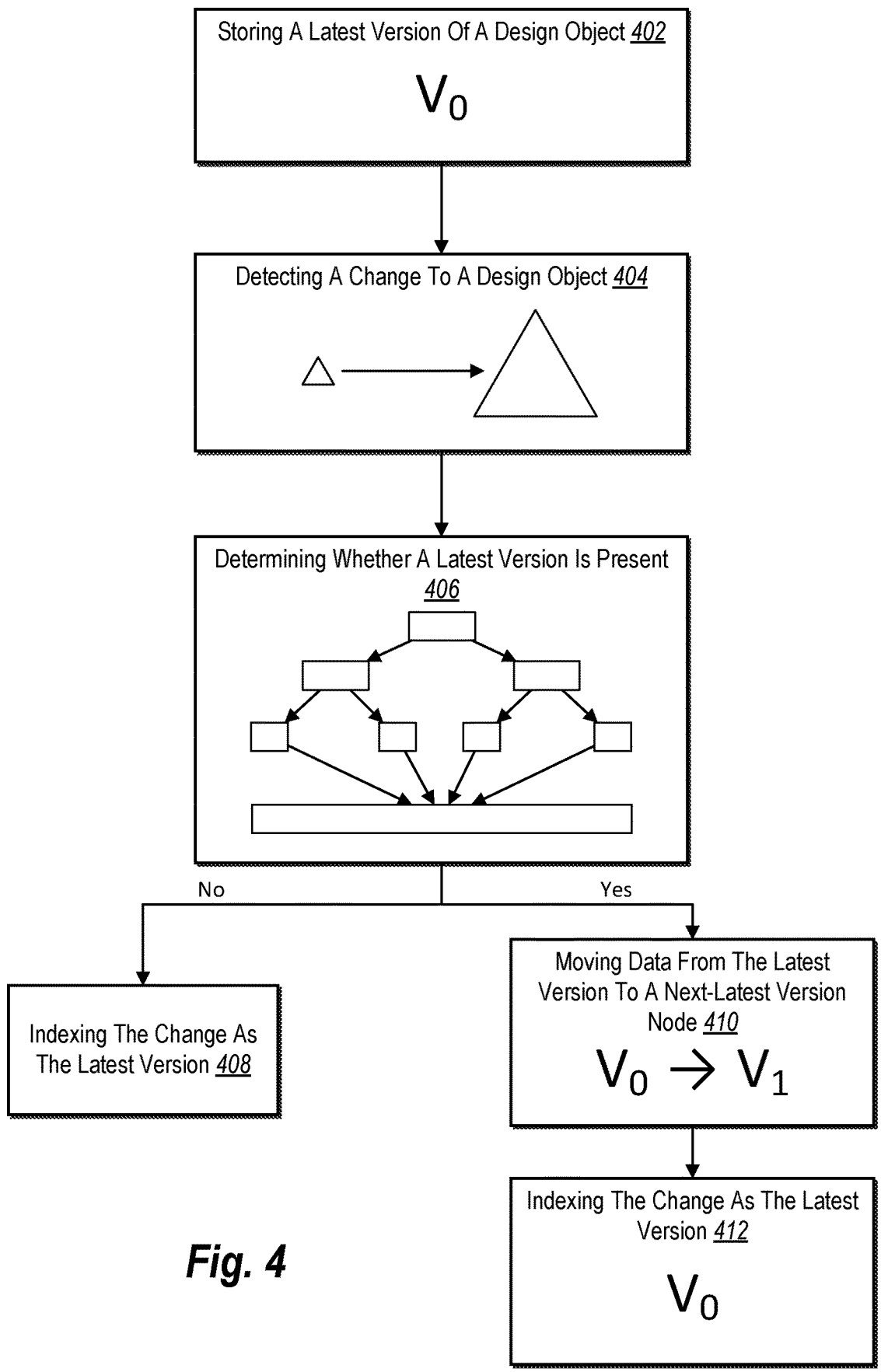
FIG. 4 illustrates versioning primitive design objects in accordance with one or more implementations of the current disclosure.

In some implementations, when updating the object-specific tree structure 314 the object-specific-modification system 102 stores version information in reverse chronological order. For example, the object-specific-modification system 102 can determine that the latest version of an object is the zeroth version ($V_0$). As illustrated, node 320 comprises DP5 pointing to a location in the data file 310 storing information for the second version 318 of an object. The second version 318 is the latest version of the object. The object-specific-modification system 102 further updates node 322 to indicate that the data stored at the location for DP2 corresponds to the first version 316 or the next-most-recent version of the object. FIG. 4 and the corresponding discussion further detail the object-specific-modification system 102 updating version data in accordance with one or more embodiments.

As illustrated in FIG. 3, the object-specific-modification system 102 performs the act 308 of generating the updated digital design document utilizing the object-specific version representation. Based on receiving an additional user interaction indicating an object-specific undo operation on a modified object, the object-specific-modification system 102 accesses relevant object data stored within the data file 310. In particular, the object-specific-modification system 102 begins by identifying information corresponding to the $0^{th}$ block corresponding to a design object identifier. The object-specific-modification system 102 traverses all associated blocks corresponding to the design object identifier. For example, in some implementations, the object-specific-modification system 102 utilizes the following MakeNodeKey function to create a 64-bit node identifier to access the object data:

MakeNodeKey (id,v,i) return (id<<32)|(v<<16)|i

Where v is the desired version for retrieval, id is the design object identifier, and i is the associated block number in the data file 310.

In one example, the object-specific-modification system 102 receives an additional user interaction indicating an object-specific undo operation on the second version 318 of an object. The object-specific-modification system 102 identifies information corresponding to the $0^{th}$ block corresponding to the design object identifier $O_2$. For example, the object-specific-modification system 102 identifies the node 320 reflecting information for the latest version. The node 320 includes information such as the block number. To retrieve information corresponding to the object, the object-specific-modification system 102 traverses all blocks associated with the design object identifier $O_2$. More specifically, in some implementations, the object-specific-modification system 102 searches for incremental versions in the object-specific tree structure 314. For example, the object-specific-modification system 102 further locates the node 322 reflecting the next-most-recent version of the object (e.g., $V_1$). In some implementations, the object-specific-modification system 102 continues to search the object-specific tree structure 314 for additional nodes reflecting earlier versions of the object. For instance, the object-specific-modification system 102 can continue its search until locating the node within the object-specific tree structure 314 corresponding to the desired version. The object-specific-modification system 102 can traverse all the versions of the object both in reverse and forward directions to undo and redo edits, respectively.

Furthermore, and as illustrated, the object-specific-modification system 102 locates content in the data file 310 based on the identified nodes. For example, based on identifying the node 322, the object-specific-modification system 102 follows the data pointer DP2 to a location within the data file 310. The object-specific-modification system 102 retrieves the version data at the location within the data file 310 to update the design object. More specifically, the object-specific-modification system 102 retrieves data for the first version 316 and generates a reverted object comprising the first version 316.

In one or more examples, the object-specific-modification system 102 stores the entirety of an object's version information in the data file 310. To illustrate, for an object, the object-specific-modification system 102 can stream all the object's versions' information in the data file 310. For example, the object-specific-modification system 102 can store all object data for the first version 316 and the second version 318 within the data file 310.

Additionally, or alternatively, the object-specific-modification system 102 stores only compressed version data within the data file 310 to improve storage efficiency. For example, in some instances, the object-specific-modification system 102 determines that a number of objects within the digital design document exceeds a threshold value. Based on this determination, the object-specific-modification system 102 does not store the full object content for each version of the object.

As mentioned, the object-specific-modification system 102 utilizes a relational database-based storage system to efficiently store version data for objects within a digital design. In some implementations, the object-specific-modification system 102 stores information of each version of an object utilizing a packing mechanism. For example, the object-specific-modification system 102 may utilize a packing mechanism similar to a Git packing system described in Derrick Stolee. Git internals: a database perspective. Git Merge 222 September 2022, which is hereby incorporated by reference in its entirety. Generally, the object-specific-modification system 102 can compress all of an object's versions' information against each other to take advantage of common data. The object-specific-modification system 102 can compute a difference between two versions of an object (e.g., the first version 316 and the second version 318). In some examples, the object-specific-modification system 102 utilizes a Myers or Histogram algorithm for computing diffs (or deltas). For instance, the object-specific-modification system 102 determines that each version's data begins with an integer offset value pointing to the relative position of a previous version data of the object in the data file 310. The remaining version data specifies a list of instructions which either instruct how to copy data from the base version or to write new data chunks.

In some examples, the object-specific-modification system 102 determines an offset value based on another version that itself is based on another offset version (e.g., determining a second offset value for an additional version based on a first offset value of a previous version). The object-specific-modification system 102 thus creates a delta chain that requires computing the version data for each version while fetching version information. To minimize the cost during read time, the object-specific-modification system 102 may use the most recent version as the base and compute the delta chain in reverse-chronological order. This allows queries involving recent versions to have minimum overhead while queries involving older versions have slightly more overhead. Accordingly, the object-specific-modification system 102 can analyze the base of the delta chain to determine a first version, utilize a first offset value (and the base) to determine a second version, utilize a second offset value (and the second version) determine a third version, and so on. Thus, the object-specific-modification system 102 can utilize the delta chain to efficiently store and extract version information for digital design objects.

In some embodiments, the object-specific-modification system 102 utilizes a selective undo algorithm to efficiently identify and retrieve any particular version of an object. In some embodiments, the object-specific-modification system 102 presents an object history panel via a user interface of the client device. The object history panel can comprise a listing of modifications performed on a particular object. In another implementation, the object history panel comprises a listing of versions of the object. In one example, the object-specific-modification system 102 detects an interaction indicating selection of an $i_{th}$ version of an object represented by a design object identifier id. In some embodiments, the object-specific-modification system 102 utilizes the following selective undo algorithm:

```
1:      procedure MAKEKEY(id,v,b)
2:         return (id << 32)|(V << 16)|b
3:      procedure COUNTVERSION(id,v)
4:         v ← 0
5:         count ← 0
6:         while v + + do
7:            k ← MAKEKEY(id,v,0)
8:            if k is not available in Index Tree then
9:               break
         return v
``` where id represents the design object identifier, v represents an object version, b represents a block number.

In some implementations, the object-specific-modification system 102 retrieves the change data from the data file 310 and deletes object versions from $(i+1)_{th}$ to $n_{th}$, where n represents the most recent version of an object. For instance, if the object-specific-modification system 102 undoes a set number of edits to a modified object to generate the reverted object, the object-specific-modification system 102 can remove data for the versions corresponding to the set number of edits.

In some examples, the object-specific-modification system 102 stores object versions from $(i+1)_{th}$ to $n_{th}$ until the object-specific-modification system 102 finalizes an object-specific undo operation. For example, in some implementations, the object-specific-modification system 102 presents, for display via a graphical user interface of the client device, a preview of a previous version of a design object. For instance, the object-specific-modification system 102 may generate an updated digital design document as part of generating a preview to present on a client device. The object-specific-modification system 102 may further generate a series of previews comprising sequential versions of a design object. The object-specific-modification system 102 presents the series of previews to the client device so that the designer can select a desired version of the design object. Thus, in some implementations, the object-specific-modification system 102 stores object versions while generating previews of the digital design document. The object-specific-modification system 102 may delete the object versions from $(i+1)_{th}$ to $n_{th}$ based on receiving a selection of a desired version of the design object.

Figure 5:
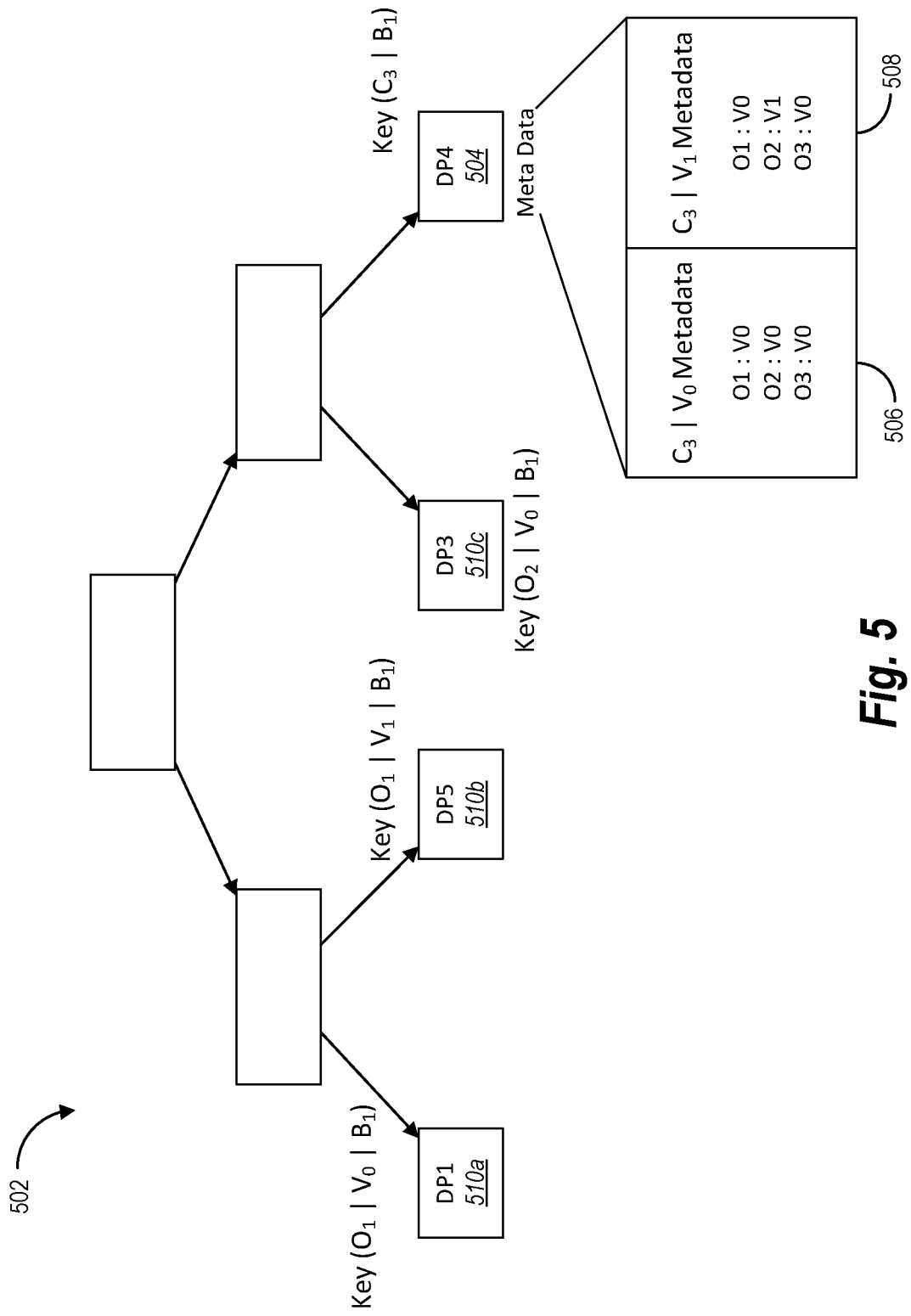
FIG. 5 illustrates versioning composite design objects in accordance with one or more implementations of the current disclosure.

The object-specific-modification system 102 can manage version data for both primitive design objects and composite design objects. The term primitive design object refers to individual art objects like a path object, text object, or other object. For example, a primitive design object comprises a single shape or design element within a digital design document. The term composite design object can refer to a design object comprising a plurality of component design objects. A composite design object may comprise a combination of path objects, text objects, composite design objects, or other types of design objects. In one example, a composite design object comprises a subset of design objects that a designer has selected for performance of an object-specific undo operation. FIGS. 4-5 illustrate the object-specific-modification system 102 storing and accessing version data for primitive design objects and composite design objects in accordance with one or more implementations.

FIG. 4 illustrates the object-specific-modification system 102 versioning primitive design objects in accordance with one or more implementations of the current disclosure. By way of overview, FIG. 4 illustrates an act 402 of storing a latest version of a design object, an act 404 of detecting a change to a design object, an act 406 of determining whether a latest version is present, an act 408 of indexing the change as the latest version, an act 410 of moving data from the latest version to a next-latest version node, and an act 412 of indexing the change as the latest version.

As shown in FIG. 4, the object-specific-modification system 102 performs the act 402 of storing a latest version of a design object. In particular, the object-specific-modification system 102 stores an object's latest version in a node which is indexed as version 0 ($V_0$). The object-specific-modification system 102 stores the last or most recent version of an object as version 0. In some examples, the object-specific-modification system 102 avoids separate maintenance of various objects linking with each other by keeping the latest version of a design object as version 0.

In some embodiments, the object-specific-modification system 102 keeps track of a total number of versions preserved for an object. More specifically, every time an object is modified, the object-specific-modification system 102 preserves the change information in the data file and in the object-specific version representation. Based on detecting changes, the object-specific-modification system 102 increases the total number of versions of the object by 1.

FIG. 4 illustrates the object-specific-modification system 102 performing the act 404 of detecting a change to a design object. Based on detecting the change to the design object, the object-specific-modification system 102 performs the act 406 of determining whether a latest version is present. For example, in some embodiments, the object-specific-modification system 102 searches the object-specific version representation to identify a latest version $V_0$ of the modified design object.

As further shown in FIG. 4, based on determining that a latest version of an object is not present, the object-specific-modification system 102 performs the act 408 of indexing the change as the latest version. For example, in some implementations, the detected change to the design object could be an addition of the design object into the digital design document. The object-specific-modification system 102 may determine that the object-specific version representation does not contain a design object identifier corresponding to the modified object. In this instance, the object-specific-modification system 102 generates a new node in the object-specific version representation, wherein the new node reflects an object identifier, a version representation ($V_0$), and a block number. The object-specific-modification system 102 further stores raw data for the modified object in the data file.

Based on determining that the latest version of an object is present, the object-specific-modification system 102 performs a series of acts including the act 410 and the act 412. The object-specific-modification system 102 may have already preserved n versions of the object in the data file. The object-specific-modification system 102 performs the act 410 of moving data from the latest version to a next-latest version node. More particularly, the object-specific-modification system 102 moves the data from the version 0 node to a new node. For example, the object-specific-modification system 102 can move the data from the version 0 node to a version 1 ($V_1$) node. The object-specific-modification system 102 performs the same movement in all nodes up to version n ($V_n$). In some implementations, the object-specific-modification system 102 indexes existing nodes using an increased version number. More particularly, the object-specific-modification system 102 changes a version representation for an existing node to indicate that it is one version earlier.

As further illustrated in FIG. 4, the object-specific-modification system 102 performs the act 412 of indexing the change as the latest version. The object-specific-modification system 102 preserves the latest version information in nodes indexed as version 0 nodes. In this way, in one or more embodiments the object-specific-modification system 102 ensures that the latest version information is always preserved in version 0 nodes. After preserving the new change's information, the object-specific-modification system 102 increments the count of total number of versions of the object by 1. Because the object-specific-modification system 102 performs only a single move operation for preserving new version information, it is highly efficient for persisting any number of versions of the objects.

Turning back to FIG. 3, the object-specific tree structure 314 provides an illustrative example of the object-specific-modification system 102 generating a new node based on detecting a change to an object. As shown in FIG. 3, the object having the design object identifier $O_2$ is modified from the first version 316 to the second version 318 by shading the object. The object-specific-modification system 102 stores the change information in the data file 310 and generates a data pointer (DP5) which points to the new version information in the data file 310. The object-specific-modification system 102 changes the node 322, which points to data for the first version 316 of the object, from a version 0 node to a version 1 node. The object-specific-modification system 102 creates new nodes in the object-specific tree structure 314. For example, the object-specific-modification system 102 generates the node 320, which is the new version 0 node. The object-specific-modification system 102 points the new version 0 node (i.e., the node 320) to the latest version data pointer (i.e., DP5).

As mentioned previously, the object-specific-modification system 102 also versions composite design objects. FIG. 5 illustrates the object-specific-modification system 102 versioning composite design objects in accordance with one or more implementations of the current disclosure. In particular, FIG. 5 illustrates an object-specific version representation 502 comprising primitive nodes 510*a*-510*c* and a composite node 504.

As mentioned, the object-specific-modification system 102 may identify composite design objects. In some implementations, the object-specific-modification system 102 identifies composite design objects when they are created. For example, composite design objects comprise a combination of primitive design objects and/or composite design objects. In one example, the object-specific-modification system 102 identifies a composite design object based on a combination of design objects that are created in close proximity (e.g., within a threshold distance) of each other.

Based on identifying a composite design object, the object-specific-modification system 102 generates a composite node in the object-specific version representation. For example, based on determining the creation of a composite design object, the object-specific-modification system 102 generates the composite node 504 illustrated in FIG. 5. The composite node 504 is associated with a composite design object identifier ($C_3$) and a block number ($B_1$). The object-specific-modification system 102 also generates a data pointer that enables the object-specific-modification system 102 to locate data information for the composite design object within the data file.

In some implementations, and as illustrated in FIG. 5, the object-specific-modification system 102 generates meta data for the composite node that reflects version data for the plurality of design objects corresponding to the composite design object. The term "plurality of design objects" can refer to primitive design objects and/or composite design objects that make up a composite design object. In some embodiments, the object-specific-modification system 102 generates meta data reflecting design object identifiers for a plurality of design objects. The object-specific-modification system 102 can generate lists that indicate both design objects within the plurality of design objects and corresponding version data for the plurality of design objects at a particular point in time. For instance, the object-specific-modification system 102 generates a new list every time the object-specific-modification system 102 detects a modification to the composite design image. As illustrated in FIG. 5, the object-specific-modification system 102 generates a list 506 and a list 508 as part of generating meta data for a composite design object.

As mentioned, the object-specific-modification system 102 records design object identifiers for the plurality of design objects within the composite design object. For example, and as shown by list 506 and list 508, the composite design object having the composite design object identifier $C_3$ comprises component design objects having the design object identifiers O1, O2, and O3. The inclusion of the design object identifiers keeps track of all primitive nodes.

As part of generating the meta data the object-specific-modification system 102 stores version data for the plurality of design objects. For instance, based on detecting a modification to a component design object within the composite design object, the object-specific-modification system 102 computes version data for the component design objects and stores the version data for the plurality of design objects in the meta data. More specifically, the object-specific-modification system 102 stores version data in the list 506 and the list 508.

As illustrated in the object-specific version representation 502 in FIG. 5, the object-specific-modification system 102 generates the list 506 and the list 508. The list 506 corresponds to version zero $V_0$ (i.e., the latest version) of the composite design object having the composite design object identifier $C_3$. As shown by the list 506, version zero of the composite design object comprises version zero of each of the plurality of design objects. More specifically, a first design object (O1), a second design object (O2), and a third design object (O3) are all in their latest version. The list 508 comprises metadata for the next-latest version ($V_1$) of the composite design object. As shown, the first and the third design objects are in their latest versions. However, the second design object (O2) is in its first version ($V_1$).

In some implementations, the object-specific-modification system 102 does not change the content of the composite nodes. Instead, the object-specific-modification system 102 stores the meta data over and above existing composite-node-specific data in the data file. Accordingly, the object-specific-modification system 102 does not increase the version of the composite node. As illustrated in FIG. 5, in some implementations, the object-specific-modification system 102 does not store version data with the composite node 504. Instead, the object-specific-modification system 102 generates new meta data lists corresponding to each version of the composite node.

The object-specific-modification system 102 can generate new meta data lists for a composite node based on events including the addition, removal, or reordering of any nodes corresponding with the plurality of design objects. In the case of an addition, removal, or reordering of nodes corresponding to the plurality of design objects, the object-specific-modification system 102 streams the current list of component design objects and generates a new list corresponding to the new version of the composite design object. The object-specific-modification system 102 also generates new meta data lists based on modifications in the property of the component node. For example, the object-specific-modification system 102 generates a new meta data list for the composite nodes based on detecting modifications to any design object in the plurality of design object. As illustrated in FIG. 5, based on detecting that the design object O2 is modified, the object-specific-modification system 102 modifies the node corresponding to the design object O2 and generates the list 506.

As mentioned, the object-specific-modification system 102 provides a graphical user interface that enables a designer to efficiently indicate an object-specific undo operation. FIGS. 6A-6E illustrate a series of graphical user interfaces comprising a digital design document and an object-specific undo element in accordance with one or more implementations of the present disclosure.

Figure 6A:
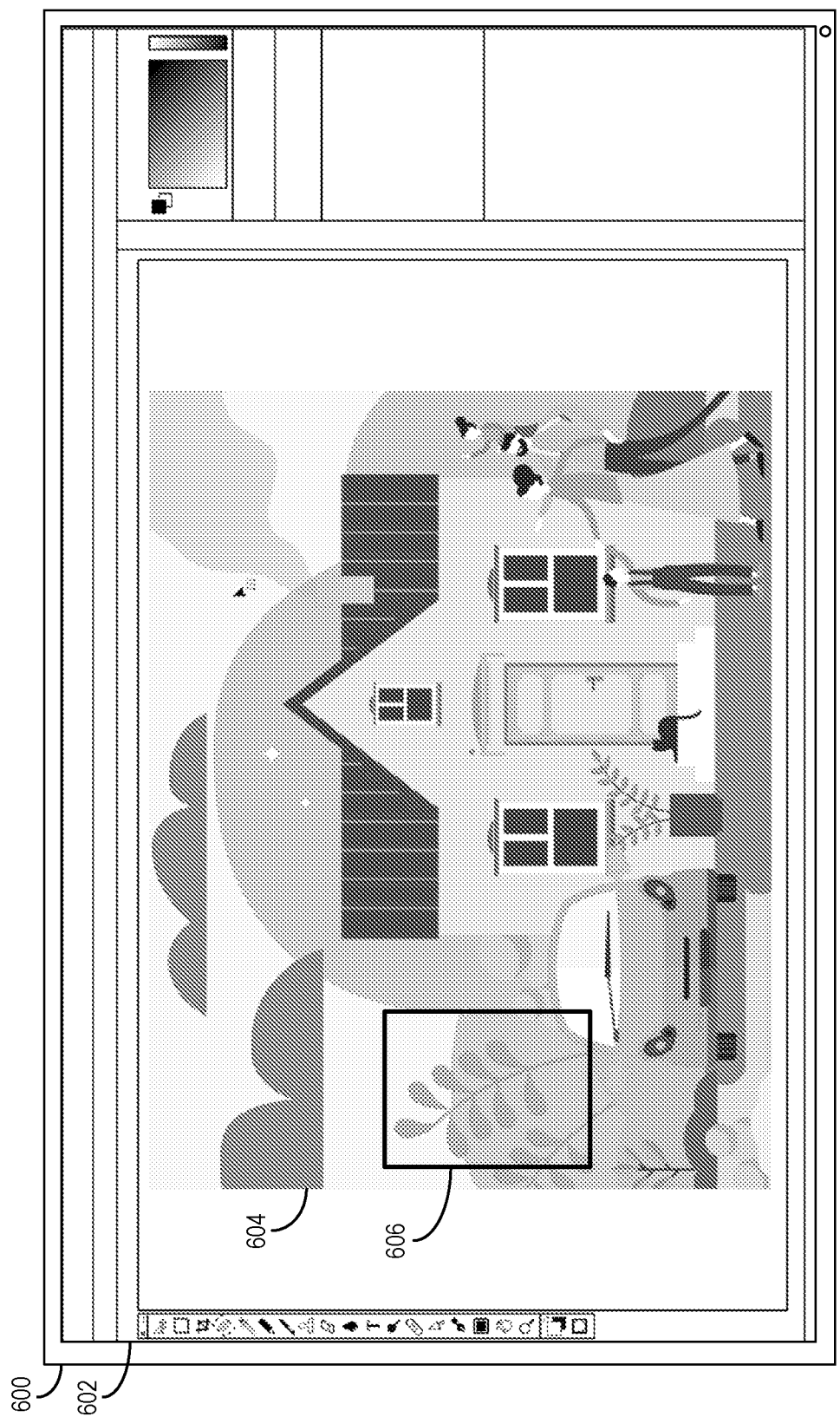
FIGS. 6A-6E illustrate a series of graphical user interfaces comprising a digital design document and an object-specific undo element in accordance with one or more implementations of the present disclosure.

FIG. 6A illustrates a digital design document graphical user interface 604 presented via a screen 602 of a client device 600 (e.g., the client device 108). The object-specific-modification system 102 presents a digital design document and design objects via the digital design document graphical user interface 604. More specifically, the digital design document illustrated in FIG. 6A includes a composite design object 606.

Figure 6B:
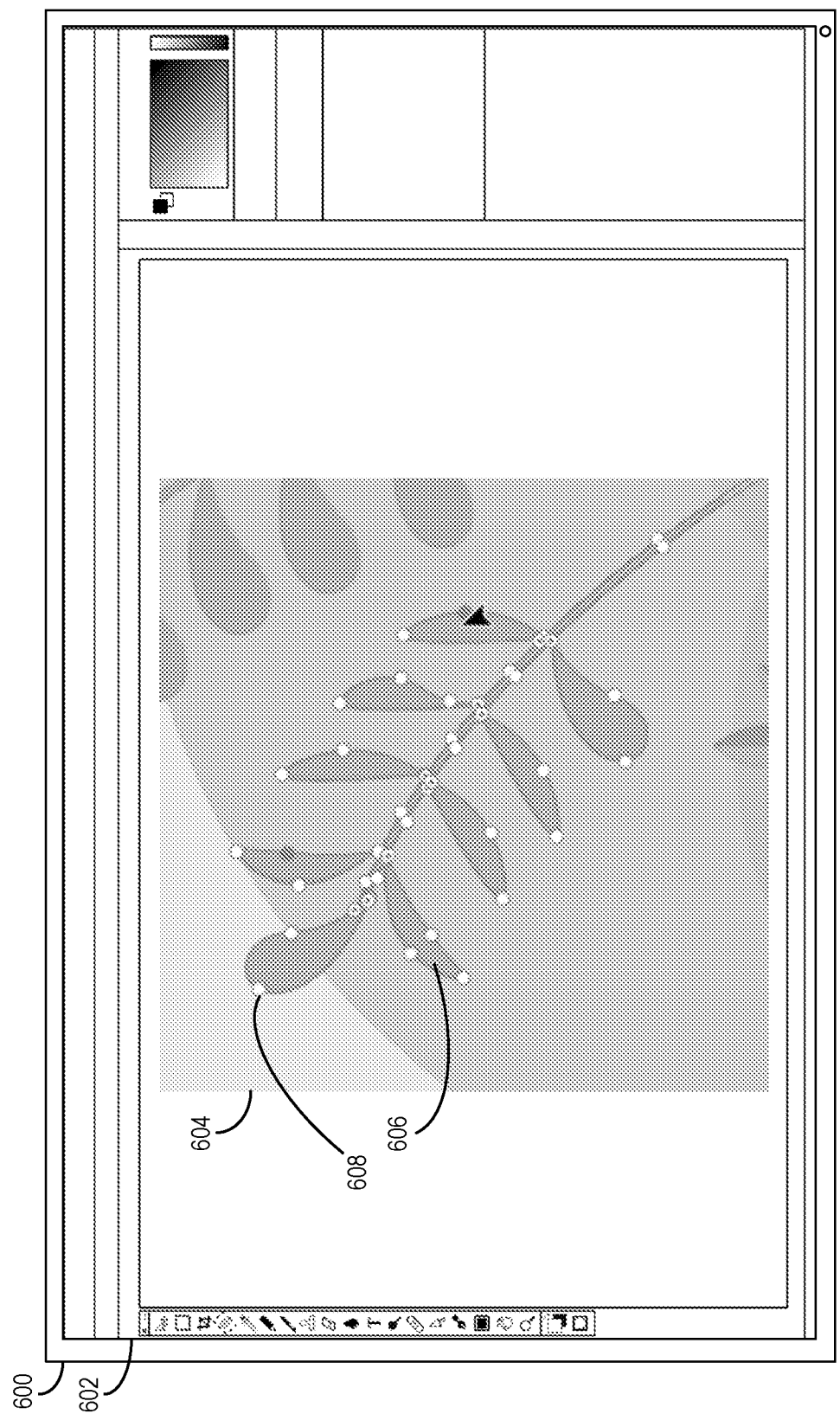

FIG. 6B illustrates a zoomed-in view of the composite design object 606 within the digital design document graphical user interface 604. FIG. 6B illustrates the digital design document graphical user interface 604 on the screen 602 of the client device 600. As shown, the composite design object 606 comprises component design objects. For instance, each leaf and the stem comprises a (primitive) design object. In some implementations, the object-specific-modification system 102 can modify the design objects within the plurality of design objects based on user interaction with modification element 608 or any of the modification elements depicted in FIG. 6B.

Figure 6C:
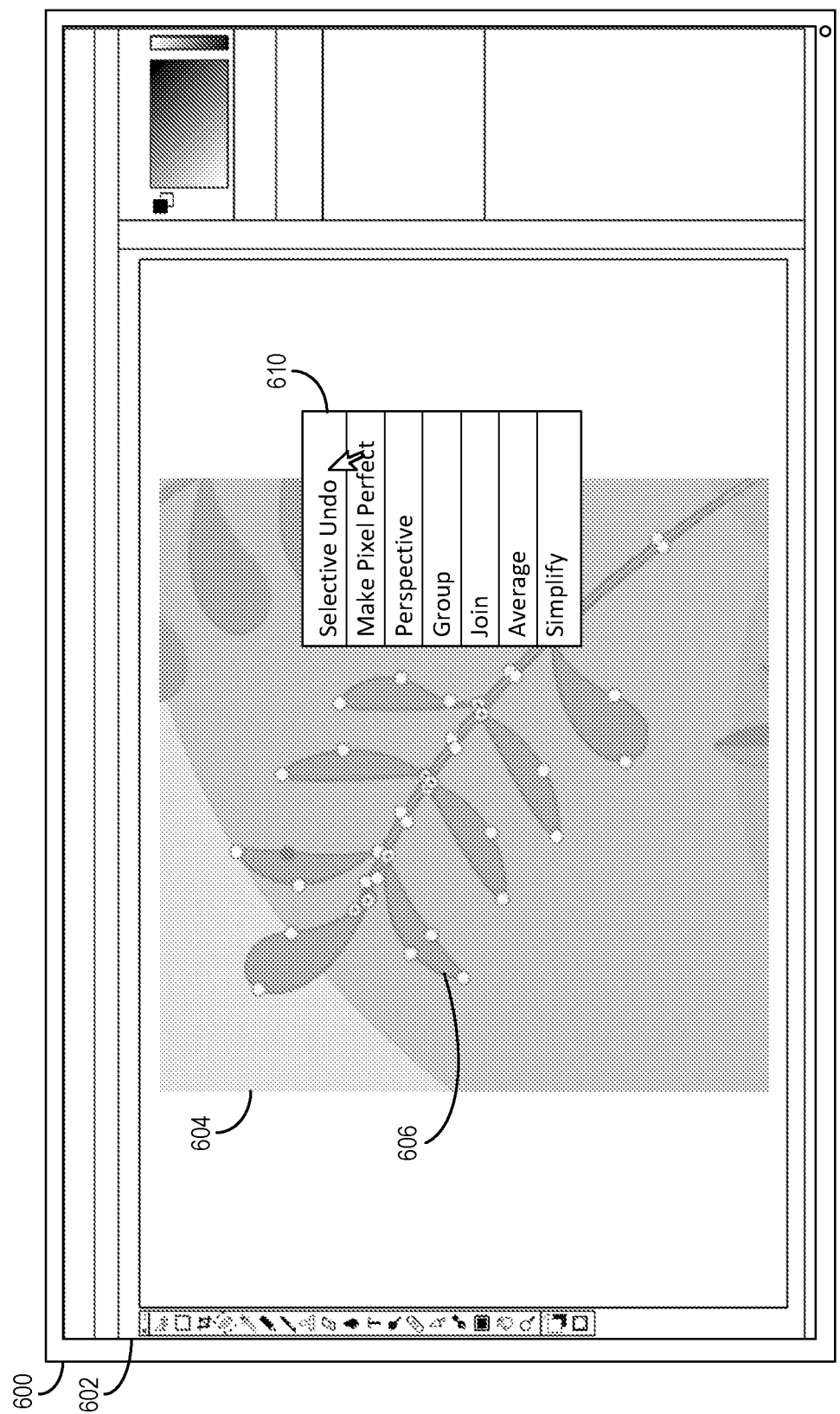

As mentioned, the object-specific-modification system 102 provides an object-specific undo element for display via a graphical user interface of the client device. FIG. 6C illustrates an example object-specific undo element in accordance with one or more embodiments. In particular, FIG. 6C illustrates the digital design document graphical user interface 604 displayed via the screen 602 of the client device 600. The object-specific-modification system 102 presents an object-specific undo element corresponding to a design object. As shown in FIG. 6C, the object-specific-modification system 102 presents, for display via the digital design document graphical user interface 604, an object-specific undo element 610. For example, in some implementations, the object-specific-modification system 102 presents the object-specific undo element 610 based on user selection of the composite design object 606.

Additionally, or alternatively, the object-specific-modification system 102 can present an object-specific redo element. For instance, if the object-specific-modification system 102 has performed an object-specific undo operation on the composite design object 606, the object-specific-modification system 102 can determine to present an object-specific redo element in relation to the composite design object 606. Based on detecting user interaction with the object-specific undo element 610, the object-specific-modification system 102 can present a version-selection element via the digital design document graphical user interface 604 of the client device 600.

Figure 6D:
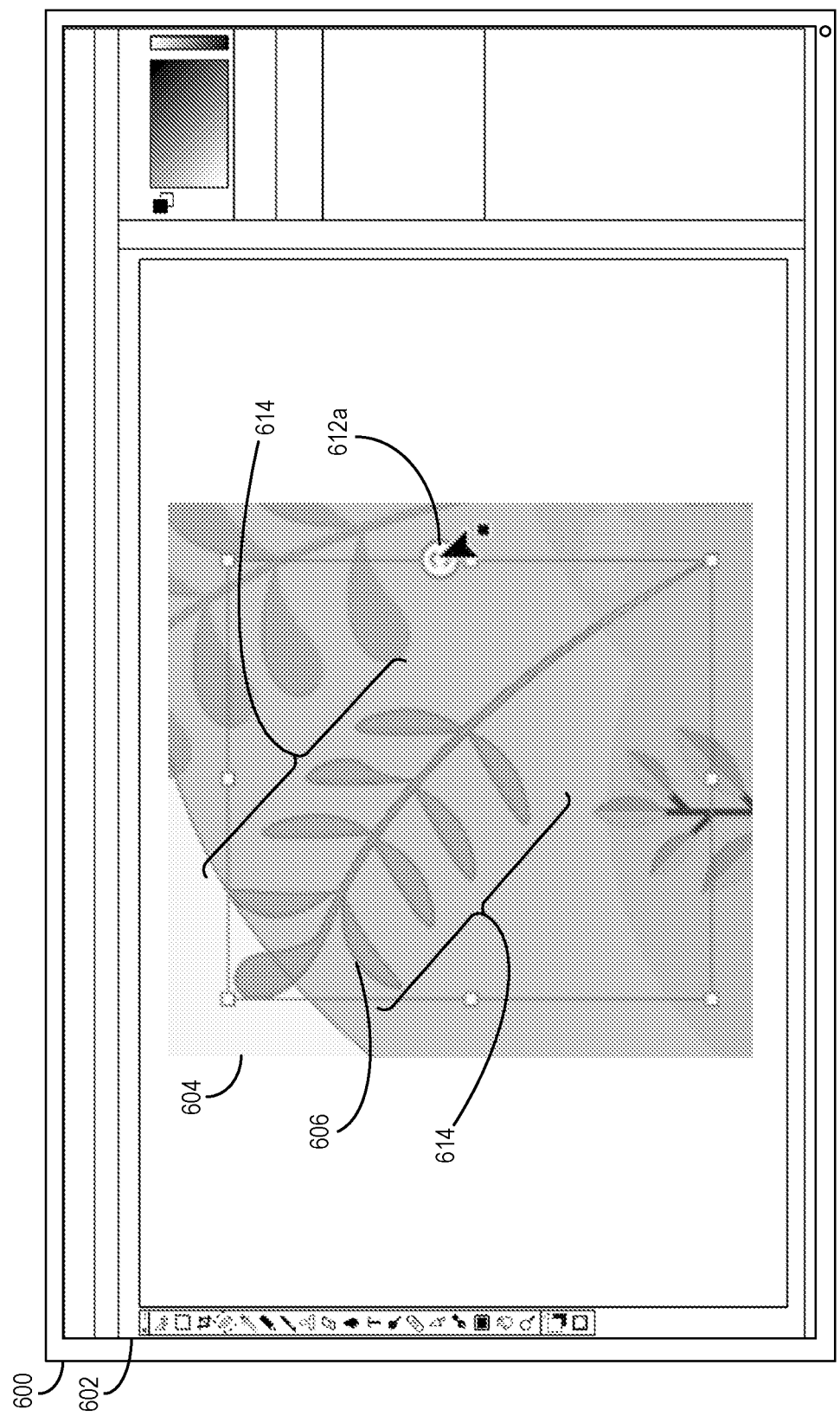

For example, FIG. 6D illustrates an example version selection element in accordance with one or more embodiments of the present disclosure. FIG. 6D illustrates the digital design document graphical user interface 604 presented via the screen 602 of the client device 600. Generally, the object-specific-modification system 102 receives indications of object-specific undo operations based on user interaction with a version selection element. FIG. 6D illustrates a version selection element 612a. In some implementations, the object-specific-modification system 102 detects selection of the version selection element 612a in a first position. The version selection element 612a can be dragged in any direction from the first position. The object-specific-modification system 102 may associate different positions within the digital design document graphical user interface 604 with different versions of the composite design object 606. For example, the object-specific-modification system 102 can associate earlier versions of the composite design object 606 with positions that are farther from the first position. For example, based on user interaction with the version selection element 612a, the object-specific-modification system 102 modifies the composite design object 606 to display previous versions of the composite design object 606. To illustrate, the composite design object 606 comprises leaves 614. The leaves 614, in the most recent version of the composite design object 606 all have a flattened shape.

Figure 6E:
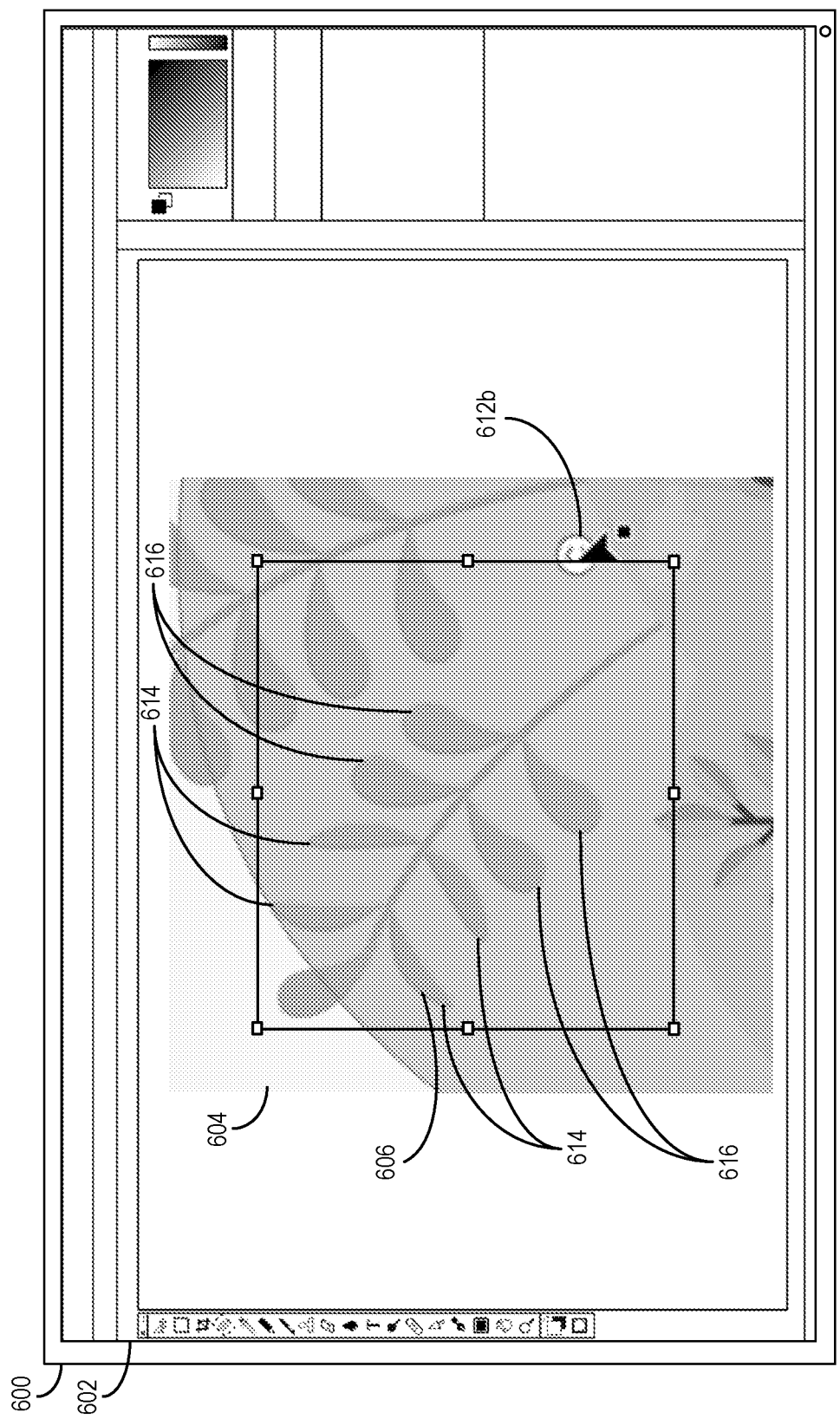

FIG. 6E illustrates modifications presented by the object-specific-modification system 102 based on user interaction with the version selection element 612a. As shown in FIG. 6E, the object-specific-modification system 102 detects movement of the version selection element 612b to a second position that is lower than the first position. In response, the object-specific-modification system 102 provides an operation preview via the digital design document graphical user interface 604. In some examples, the operation preview comprises a preview of a particular version of a design object before the object-specific-modification system 102 performs an undo or redo operation. For example, the object-specific-modification system 102 can present, via the digital design document graphical user interface 604, a series of previews for sequential versions of the composite design object 606 based on detecting that the designer is interacting with (e.g., moving) the version selection element 612b. For example, in the preview illustrated in FIG. 6E, the object-specific-modification system 102 presents a version of the composite design object 606 in which the leaves 614 remain in their modified flattened shape and leaves 616 are reverted to a rounder shape. For example, the object-specific-modification system 102 undoes edits to the leaves 616 and displays the reverted leaves via the digital design document graphical user interface 604.

In some embodiments, the object-specific-modification system 102 also performs object-specific redo operations based on user interactions with the version selection element 612b. For example, based on determining that the user is dragging the version selection element 612b back toward the first position, the object-specific-modification system 102 may reapply undone edits to the composite design object 606. For example, the object-specific-modification system 102 can utilize the object-specific version representation to identify newer versions of design objects. In one example, based on determining that a designer has dragged the version selection element 612b into the first position, the object-specific-modification system 102 generates and presents a preview in which narrowing edits have been reapplied to the leaves 616. More specifically, the object-specific-modification system 102 sequentially reapplies edits to the composite design object 606 until the composite design object 606 is in its latest version.

FIGS. 6D-6E illustrate the object-specific-modification system 102 presenting a version selection element comprising a draggable user interface element. In some implementations, the version selection element comprises an object history panel. For example, as mentioned previously, the object history panel can comprise a listing of modifications performed on the particular object. The object-specific-modification system 102 may list modifications such as closing a path, applying a swatch, moving a curvature point, and other modifications. Based on detecting a user selection of a listed modification, the object-specific-modification system 102 may provide a preview of the design object after the object-specific-modification system 102 has undone an edit. The object-specific-modification system 102 may further provide a confirmation element via the graphical user interface. Based on user selection of the confirmation element, the object-specific-modification system 102 confirms the undo or redo operation.

Figure 7:
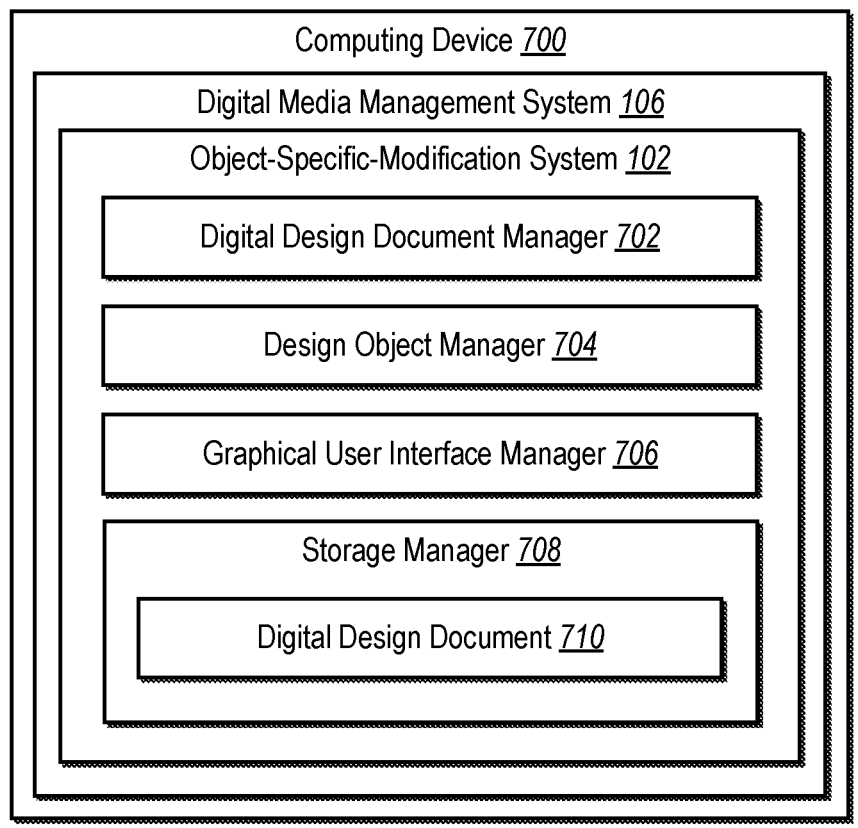
FIG. 7 illustrates an example schematic diagram of the object-specific-modification system in accordance with one or more embodiments.

Looking now to FIG. 7, additional detail will be provided regarding components and capabilities of the object-specific-modification system 102. Specifically, FIG. 7 illustrates an example schematic diagram of the object-specific-modification system 102 on an example computing device 700 (e.g., one or more of the client device 108 and/or the server(s) 104). In some embodiments, the computing device 700 refers to a distributed computing system where different managers are located on different devices, as described above. As shown in FIG. 7, the object-specific-modification system 102 includes a digital design document manager 702, a design object manager 704, a graphical user interface manager 706, and a storage manager 708.

As just mentioned, the object-specific-modification system 102 includes the digital design document manager 702. In particular, the digital design document manager 702 can receive, manage, maintain, and/or provide digital design documents. For example, as described above, the digital design document manager 702 can receive and/or generate a modified digital design document and present an updated digital design document.

As shown in FIG. 7, the object-specific-modification system 102 also includes the design object manager 704. The design object manager 704 can obtain, receive, generate, manage, and/or identify design objects. For example, the design object manager 704 can identify modified objects, undo edits to digital objects, and generate reverted objects. In some implementations, the design object manager 704 can also obtain, receive, generate, manage, and/or identify an object-specific version representation. More specifically, the design object manager 704 can generate reverted objects based on the object-specific version representation.

Moreover, the object-specific-modification system 102 also includes the storage manager 708. The storage manager 708 operates in conjunction with, or includes, one or more memory devices such as a database that stores various data such as a data file, an object-specific version representation, digital design documents, modified digital design documents, updated digital design documents 710, modified objects, reverted objects, and/or version data.

In one or more embodiments, each of the components of the object-specific-modification system 102 are in communication with one another using any suitable communication technologies. Additionally, the components of the object-specific-modification system 102 is in communication with one or more other devices including one or more client devices described above. It will be recognized that although the components of the object-specific-modification system 102 are shown to be separate in FIG. 10, any of the subcomponents may be combined into fewer components, such as into a single component, or divided into more components as may serve a particular implementation. Furthermore, although the components of FIG. 7 are described in connection with the object-specific-modification system 102, at least some of the components for performing operations in conjunction with the object-specific-modification system 102 described herein may be implemented on other devices within the environment.

The components of the object-specific-modification system 102, in one or more implementations, includes software, hardware, or both. For example, the components of the object-specific-modification system 102 include one or more instructions stored on a computer-readable storage medium and executable by processors of one or more computing devices (e.g., the computing device 1100). When executed by the one or more processors, the computer-executable instructions of the object-specific-modification system 102 cause the computing device 1100 to perform the methods described herein. Alternatively, the components of the object-specific-modification system 102 comprises hardware, such as a special purpose processing device to perform a certain function or group of functions. Additionally, or alternatively, the components of the object-specific-modification system 102 includes a combination of computer-executable instructions and hardware.

Furthermore, the components of the object-specific-modification system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the object-specific-modification system 102 may be implemented as part of a stand-alone application on a personal computing device or a mobile device. Alternatively, or additionally, the components of the object-specific-modification system 102 may be implemented in any application that allows creation and delivery of marketing content to users, including, but not limited to, applications in ADOBE CREATIVE CLOUD, ADOBE PHOTOSHOP, ADOBE STOCK, and/or ADOBE ILLUSTRATOR. The foregoing are either registered trademarks or trademarks of Adobe Inc. in the United States and/or other countries.

FIGS. 1-7 and the corresponding text provide a number of different systems, methods, and non-transitory computer readable media for generating a modified digital image from a base digital image and edit text a diffusion prior. In addition to the foregoing, embodiments are describable in terms of flowcharts comprising acts for accomplishing a particular result. For example, FIGS. 8-9 illustrate flowcharts of example sequences or series of acts in accordance with one or more embodiments.

Figure 8:
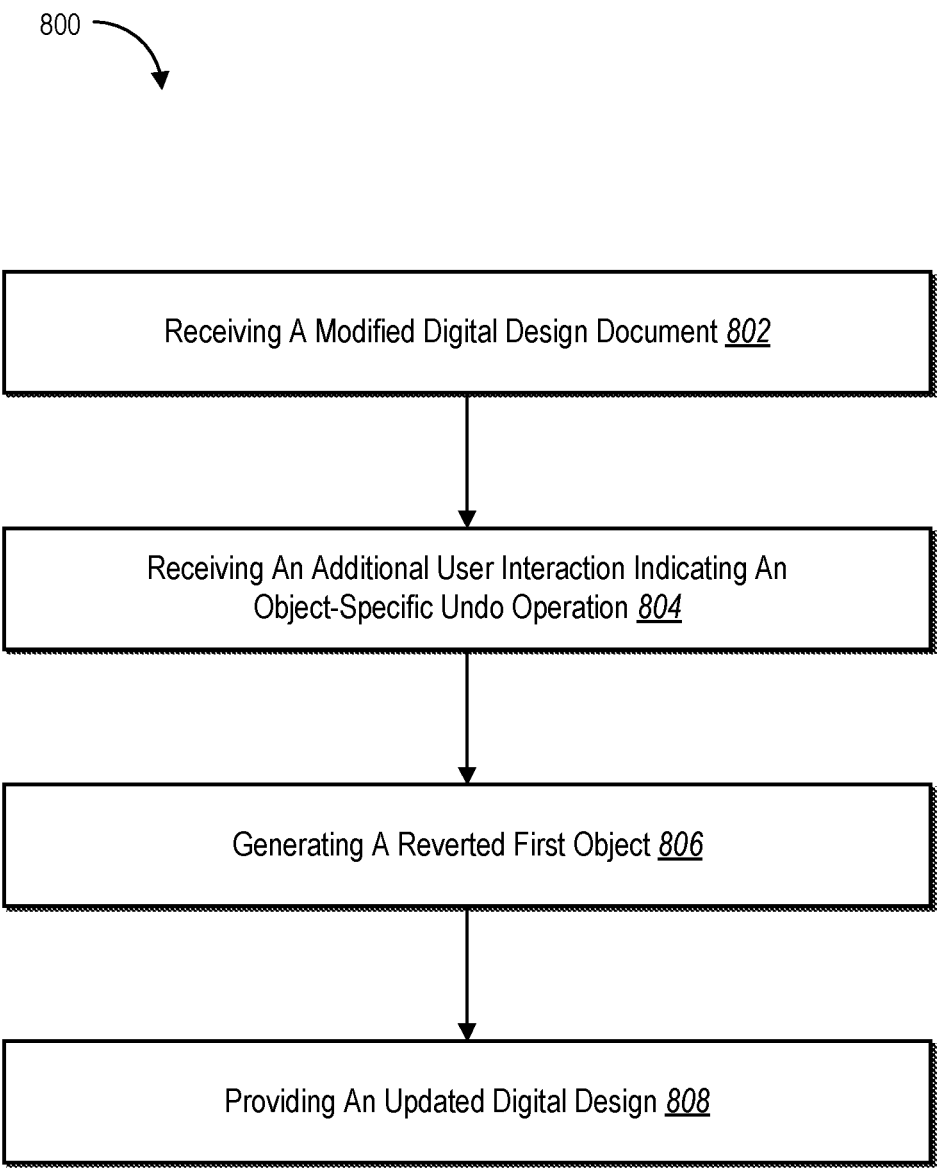
FIG. 8 illustrates a flowchart of a series of acts for generating and providing an updated digital design document in accordance with one or more embodiments.
Figure 9:
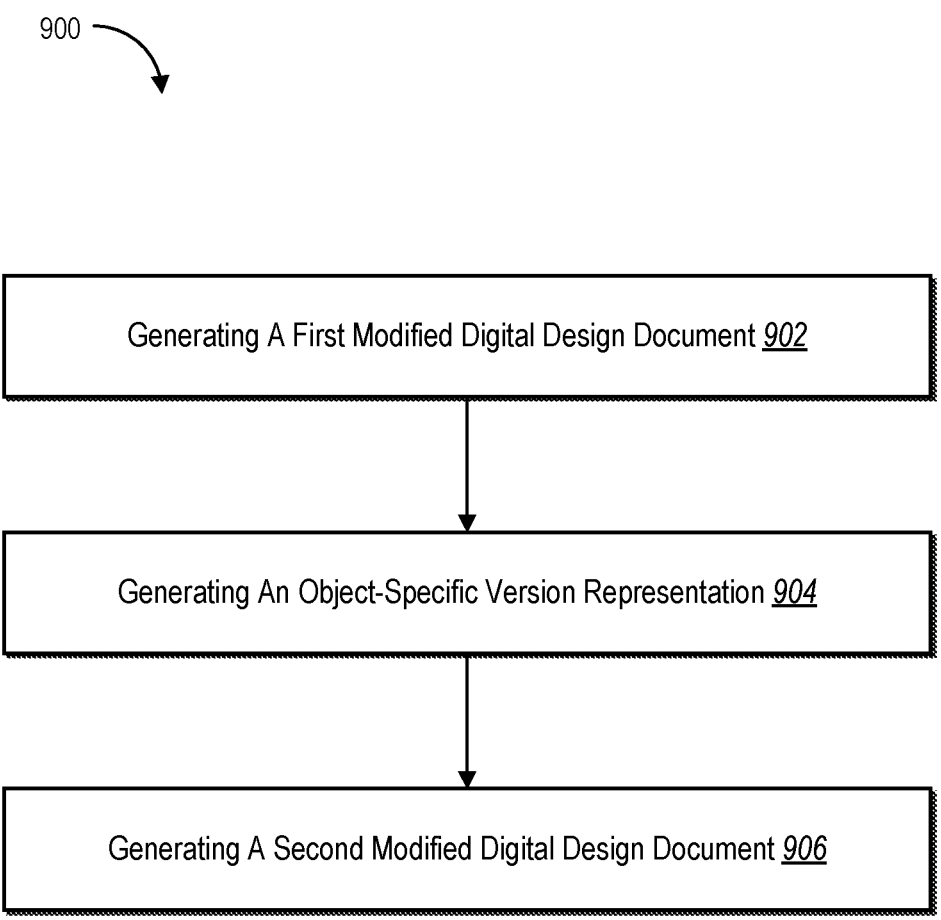
FIG. 9 illustrates a flowchart of a series of acts for generating a second modified digital design document in accordance with one or more implementations of the present disclosure.

While FIGS. 8-9 illustrate acts according to particular embodiments, alternative embodiments may omit, add to, reorder, and/or modify any of the acts shown in FIGS. 8-9. The acts of FIGS. 8-9 can be performed as part of a method (e.g., a computer-implemented method). Alternatively, a non-transitory computer readable medium comprises instructions, that when executed by one or more processors, cause a computing device to perform the acts of FIGS. 8-9. In still further embodiments, a system performs the acts of FIGS. 8-9. Additionally, the acts described herein may be repeated or performed in parallel with one another or in parallel with different instances of the same or other similar acts.

FIG. 8 illustrates an example series of acts 800 for generating and providing an updated digital design document in accordance with one or more embodiments. For example, the series of acts 800 includes acts 802-808 of receiving a modified digital design document; receiving an additional user interaction indicating an object-specific undo operation; generating a reverted first object; and providing an updated digital design document.

To illustrate, in some implementations, the acts 802-808 include receiving, based on a user interaction with a client device, a modified digital design document comprising a first modified object and a second modified object, wherein the second modified object is modified after the first modified object; receiving an additional user interaction indicating an object-specific undo operation on the first modified object; in response to receiving the additional user interaction, generating a reverted first object by undoing an edit to the first modified object; and providing, for display via a user interface of the client device, an updated digital design document comprising the reverted first object and the second modified object.

In one or more implementations, the series of acts 800 includes receiving a further user interaction indicating an object-specific redo operation on the reverted first object; and in response to receiving the further user interaction, providing, for display via the user interface of the client device, the first modified object and the second modified object.

In some embodiments, the series of acts 800 includes generating the first modified object and the second modified object by: changing a first design object from a first version to a second version; and changing a second design object from a third version to a fourth version. In some embodiments, generating the reverted first object comprises reverting the first design object to the first version.

In some implementations, the series of acts 800 includes generating an object-specific version representation comprising a first version representation of the first version and a second version representation of the second version of the first design object and a third version representation of the third version and a fourth version representation of the fourth version of the second design object; and based on the additional user interaction, generating the updated digital design document utilizing the object-specific version representation. In one or more implementations, generating the object-specific version representation further comprises: determining a first design object identifier corresponding to the first design object and a second design object identifier corresponding to the second design object; and generating an object-specific tree structure having a first plurality of nodes mapped to the first design object identifier and a second plurality of nodes mapped to the second design object identifier. In some embodiments, generating the object-specific tree structure further comprises generating the first plurality of nodes by: generating a first node reflecting the first design object identifier, a first block number, and the second version representation; and generating a second node reflecting the first design object identifier, a second block number, and the first version representation. Additionally, in one or more embodiments, generating the object-specific tree structure further comprises generating the second plurality of nodes by: generating a third node reflecting the second design object identifier, a third block number, and the fourth version representation; and generating a fourth node reflecting the second design object identifier, a fourth block number, and the third version representation.

In one or more embodiments, the first design object is a composite design object comprising a plurality of design objects and further comprising generating the object-specific version representation by: generating a composite node in the object-specific version representation; and generating meta data for the composite node that reflects version data for the plurality of design objects corresponding to the composite design object.

In one or more implementations, the series of acts 800 also includes determining a first offset value between the second version and the first version of the first design object, wherein the second version is a base version; and generating the reverted first object based on the first offset value. In addition, the series of acts can also include determining a second offset value for an additional version based on first offset value; and generating a delta chain comprising the second offset value and the first offset value in reverse chronological order. The series of acts 800 can also include extracting version information (e.g., information corresponding to the version of the digital design object) by traversing the delta chain (e.g., to extract the version information from the offset values in the delta chain).

FIG. 9 illustrates a series of acts 900 for generating a second modified digital design document in accordance with one or more implementations of the present disclosure. In particular, FIG. 9 illustrates a series of acts 900 comprising acts 902-906 comprising generating a first modified digital design document; generating an object-specific version representation; and generating a second modified digital design document.

In one or more implementations, the series of acts 900 comprises generating a first modified digital design document from a digital design document by changing a first design object from a first version to a second version and then changing a second design object from a third version to a fourth version; generating an object-specific version representation comprising the first version and the second version of the first design object and the third version and the fourth version of the second design object; and based on user interaction with an object-specific undo element, generating, utilizing the object-specific version representation, a second modified digital design document comprising the first design object in the first version and the second design object in the fourth version.

The series of acts 900 may further comprise based on user interaction with an object-specific redo element, generating, utilizing the object-specific version representation, a third modified digital design document comprising the first design object in the second version and the second design object in the fourth version.

In some implementations, generating the object-specific version representation further comprises: determining a first design object identifier corresponding to the first design object and a second design object identifier corresponding to the second design object; and generating an object-specific tree structure comprising a plurality of nodes comprising the first design object identifier and the second design object identifier and having block numbers in reverse chronological order. In some examples, generating the object-specific tree structure further comprises: generating a first plurality of nodes corresponding to the first design object by generating a first node reflecting a first block number and the second version, and a second node reflecting a second block number and the first version; and generating a second plurality of nodes corresponding to the second design object by generating a third node reflecting a third block number and the third version, and a fourth node reflecting a fourth block number and the third version.

In some examples, the series of acts 900 further comprises generating the second modified digital design document by: based on the user interaction, performing a key search of the object-specific tree structure to identify the second node reflecting the second block number and the first version; determining a data pointer corresponding to the second node; and accessing version data corresponding to the first version utilizing the data pointer.

The series of acts 900 may also comprise changing the second design object from the fourth version to a fifth version; and modifying the object-specific tree structure by: changing the third node to reflect the fifth version; and changing the fourth node to reflect the fourth version.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
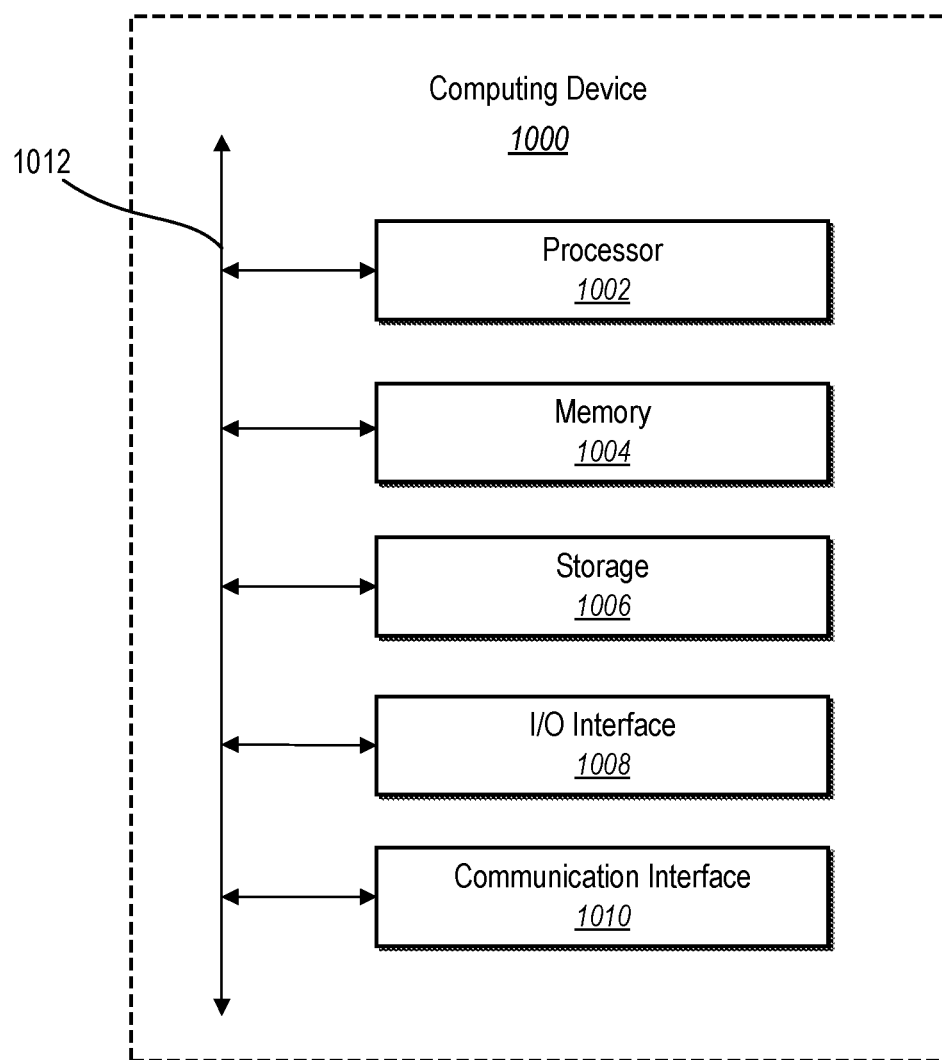
FIG. 10 illustrates a block diagram of an example computing device in accordance with one or more embodiments.

FIG. 10 illustrates, in block diagram form, an example computing device 1000 (e.g., the computing device 1100, the client device 108, and/or the server(s) 104) that may be configured to perform one or more of the processes described above. One will appreciate that the object-specific-modification system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating a first modified digital design document from a digital design document by changing a first design object from a first version to a second version and then changing a second design object from a third version to a fourth version;
generating an object-specific version representation comprising nodes for the first version and the second version of the first design object and the third version and the fourth version of the second design object, wherein the nodes correspond to data pointers that point to corresponding version information stored in a data file;
receiving an additional user interaction indicating an object-specific undo operation on the first design object;
in response to receiving the additional user interaction, identifying a node for the first version of the first design object and following a data pointer to retrieve data for the first version of the first design object within the data file; and generating, based on the data for the first version, a second modified digital design document comprising the first design object in the first version and the second design object in the fourth version.

2. The method of claim 1, further comprising:

receiving, from a user interface of a client device, a further user interaction indicating an object-specific redo operation on the first design object in the first version; and in response to receiving the further user interaction, providing, for display via the user interface of the client device, the first design object in the second version and the second design object in the fourth version.

3. The method of claim 1, further comprising generating the object-specific version representation based on detecting changes to the first design object and the second design object.

4. The method of claim 3, further comprising generating the object-specific version representation by:

collecting information corresponding to the first design object and the second design object;

storing information corresponding to the first design object under a first design object identifier within the data file, wherein the data file is separate from the object-specific version representation;

storing information corresponding to the second design object under a second design object identifier within the data file; and storing information to retrieve the information corresponding to the first design object and the information corresponding to the second design object inside nodes of the object-specific version representation.

5. The method of claim 1, further comprising:

generating the object-specific version representation by generating a first version representation of the first version and a second version representation of the second version of the first design object and a third version representation of the third version and a fourth version representation of the fourth version of the second design object; and based on the additional user interaction, generating the second modified digital design document utilizing the object-specific version representation.

6. The method of claim 5, wherein generating the object-specific version representation further comprises:

determining a first design object identifier corresponding to the first design object and a second design object identifier corresponding to the second design object; and generating an object-specific tree structure having a first plurality of nodes mapped to the first design object identifier and a second plurality of nodes mapped to the second design object identifier.

7. The method of claim 6, wherein generating the object-specific tree structure further comprises generating the first plurality of nodes by:

generating a first node reflecting the first design object identifier, a first block number, and the second version representation, wherein the first node comprises a first data pointer pointing to second version information in the data file; and generating a second node reflecting the first design object identifier, a second block number, and the first version representation, wherein the second node comprises a second data pointer pointing to first version information in the data file.

8. The method of claim 7, wherein generating the object-specific tree structure further comprises generating the second plurality of nodes by:

generating a third node reflecting the second design object identifier, a third block number, and the fourth version representation, wherein the third node comprises a third data pointer pointing to fourth version information in the data file; and generating a fourth node reflecting the second design object identifier, a fourth block number, and the third version representation, wherein the fourth node comprises a fourth data pointer pointing to third version information in the data file.

9. The method of claim 5, wherein the first design object is a composite design object comprising a plurality of design objects and further comprising generating the object-specific version representation by:

generating a composite node in the object-specific version representation; and generating meta data for the composite node that reflects version data for the plurality of design objects corresponding to the composite design object.

10. A system comprising:

a memory component; and one or more processing devices coupled to the memory component, the one or more processing devices to perform operations comprising:

generating a first modified digital design document from a digital design document by changing a first design object from a first version to a second version and then changing a second design object from a third version to a fourth version;

generating an object-specific version representation comprising nodes for the first version and the second version of the first design object and the third version and the fourth version of the second design object, wherein the nodes correspond to data pointers that point to corresponding version information stored in a data file;

receiving an additional user interaction indicating an object-specific undo operation on the first design object;

based on receiving the additional user interaction, identifying a node for the first version of the first design object and following a data pointer to retrieve data for the first version of the first design object within the data file; and generating, utilizing the object-specific version representation and the data for the first version, a second modified digital design document comprising the first design object in the first version and the second design object in the fourth version.

11. The system of claim 10, further comprising, based on user interaction with an object-specific redo element, generating, utilizing the object-specific version representation, a third modified digital design document comprising the first design object in the second version and the second design object in the fourth version.

12. The system of claim 10, wherein generating the object-specific version representation further comprises:

determining a first design object identifier corresponding to the first design object and a second design object identifier corresponding to the second design object; and generating an object-specific tree structure comprising a plurality of nodes comprising the first design object identifier and the second design object identifier and having block numbers in reverse chronological order.

13. The system of claim 12, wherein generating the object-specific tree structure further comprises:
generating a first plurality of nodes corresponding to the first design object by generating a first node reflecting a first block number and the second version, and a second node reflecting a second block number and the first version; and
generating a second plurality of nodes corresponding to the second design object by generating a third node reflecting a third block number and the third version, and a fourth node reflecting a fourth block number and the third version.

14. The system of claim 13, wherein the operations further comprise generating the second modified digital design document by:
based on the additional user interaction, performing a key search of the object-specific tree structure to identify the second node reflecting the second block number and the first version;
determining a data pointer corresponding to the second node; and
accessing version data stored in the data file corresponding to the first version utilizing the data pointer.

15. The system of claim 13, wherein the operations further comprise:
changing the second design object from the fourth version to a fifth version; and
modifying the object-specific tree structure by:
changing the third node to reflect the fifth version; and
changing the fourth node to reflect the fourth version.

16. A non-transitory computer readable medium storing executable instructions which, when executed by a processing device, cause the processing device to perform operations comprising:
generating a first modified digital design document from a digital design document by changing a first design object from a first version to a second version and then changing a second design object from a third version to a fourth version;
generating an object-specific version representation comprising nodes for the first version and the second version of the first design object and the third version and the fourth version of the second design object, wherein the nodes correspond to data pointers that point to corresponding version information stored in a data file;
receiving an additional user interaction indicating an object-specific undo operation on the first design object;
in response to receiving the additional user interaction, identifying a node for the first version of the first design object and following a data pointer to retrieve data for the first version of the first design object within the data file; and
generating, based on the data for the first version, a second modified digital design document comprising the first design object in the first version and the second design object in the fourth version.

17. The non-transitory computer readable medium of claim 16, wherein the operations further comprise:
receiving, from a user interface of a client device, a further user interaction indicating an object-specific redo operation on the first design object in the first version; and
in response to receiving the further user interaction, providing, for display via the user interface of the client device, the first design object in the second version and the second design object in the fourth version.

18. The non-transitory computer readable medium of claim 16 wherein the operations further comprise generating the object-specific version representation based on detecting changes to the first design object and the second design object.

19. The non-transitory computer readable medium of claim 16, wherein the operations further comprise:
determining a first offset value between the second version and the first version of the first design object; and
generating the first design object in the first version based on the first offset value.

20. The non-transitory computer readable medium of claim 19, wherein the operations further comprise:
determining a second offset value for an additional version based on the first offset value; and
generating a delta chain comprising the second offset value and the first offset value in reverse chronological order.

* * * * *